(12) United States Patent
Hannuksela et al.

(10) Patent No.: US 10,897,614 B2
(45) Date of Patent: Jan. 19, 2021

(54) METHOD AND AN APPARATUS AND A COMPUTER PROGRAM PRODUCT FOR VIDEO ENCODING AND DECODING

(71) Applicant: Nokia Technologies Oy, Espoo (FI)

(72) Inventors: Miska Hannuksela, Tampere (FI); Marja Salmimaa, Tampere (FI); Pekka Talmola, Turku (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/750,515

(22) Filed: Jan. 23, 2020

(65) Prior Publication Data

US 2020/0162730 A1    May 21, 2020

Related U.S. Application Data

(62) Division of application No. 15/831,274, filed on Dec. 4, 2017, now Pat. No. 10,582,198.

(30) Foreign Application Priority Data

Dec. 9, 2016    (FI) ..................................... 20165948

(51) Int. Cl.
*H04N 19/115*    (2014.01)
*H04N 13/111*    (2018.01)
(Continued)

(52) U.S. Cl.
CPC ......... *H04N 19/115* (2014.11); *H04N 13/111* (2018.05); *H04N 13/207* (2018.05);
(Continued)

(58) Field of Classification Search
None
See application file for complete search history.

(56) References Cited

U.S. PATENT DOCUMENTS 5,812,100 A   9/1998 Kuba
6,222,675 B1  4/2001 Mall et al.
(Continued)

FOREIGN PATENT DOCUMENTS

JP   2009049976 A   3/2009
WO   2017/060423 A1  4/2017

OTHER PUBLICATIONS

"Parameter Values for Ultra-High Definition Television Systems for Production and International Programme Exchange", Recommendation ITU-R BT.2020, Aug. 2012, 7 pages.
(Continued)

*Primary Examiner* — Talha M Nawaz
(74) *Attorney, Agent, or Firm* — Nokia Technologies Oy

(57) ABSTRACT

The invention relates to a method and technical equipment, wherein the method comprises obtaining a picture sequence; selecting a first spatial region and a second spatial region within a picture area of pictures of the picture sequence, the second spatial region differing from the first spatial region; obtaining a first spatial region sequence, the first spatial region sequence comprising the first spatial region of the pictures of the picture sequence; obtaining a second spatial region sequence, the second spatial region sequence comprising the second spatial region of the pictures of the picture sequence; transmitting the first spatial region sequence at a first picture rate; and transmitting the second spatial region sequence at a second picture rate, the first picture rate being different from the second picture rate.

17 Claims, 13 Drawing Sheets

(51) Int. Cl.

| | | |
|---|---|---|
| *H04N 19/597* | (2014.01) | |
| *H04N 21/4728* | (2011.01) | |
| *H04N 21/2343* | (2011.01) | |
| *H04N 21/6587* | (2011.01) | |
| *H04N 21/845* | (2011.01) | |
| *H04N 21/63* | (2011.01) | |
| *H04N 13/344* | (2018.01) | |
| *H04N 13/207* | (2018.01) | |
| *H04N 13/25* | (2018.01) | |
| *H04N 19/167* | (2014.01) | |
| *H04N 19/17* | (2014.01) | |
| *H04N 19/162* | (2014.01) | |
| *H04N 19/187* | (2014.01) | |

(52) U.S. Cl.
CPC .......... *H04N 13/25* (2018.05); *H04N 13/344* (2018.05); *H04N 19/167* (2014.11); *H04N 19/17* (2014.11); *H04N 19/597* (2014.11); *H04N 21/23439* (2013.01); *H04N 21/4728* (2013.01); *H04N 21/631* (2013.01); *H04N 21/6587* (2013.01); *H04N 21/8456* (2013.01); *G06T 2207/20104* (2013.01); *H04N 19/162* (2014.11); *H04N 19/187* (2014.11)

(56) References Cited

U.S. PATENT DOCUMENTS

| | | | |
|---|---|---|---|
| 6,922,490 | B2 | 7/2005 | Ikeda et al. |
| 7,020,335 | B1 | 3/2006 | Abousleman |
| 2008/0181498 | A1* | 7/2008 | Swenson ............. H04N 19/167 382/173 |
| 2011/0043644 | A1 | 2/2011 | Munger et al. |
| 2013/0182073 | A1 | 7/2013 | Yin et al. |
| 2014/0079126 | A1 | 3/2014 | Ye et al. |
| 2015/0029218 | A1 | 1/2015 | Williams et al. |
| 2015/0249813 | A1* | 9/2015 | Cole ................ H04N 21/21805 386/241 |
| 2016/0094606 | A1* | 3/2016 | Modai ................... H04L 65/607 375/240.24 |
| 2016/0133055 | A1 | 5/2016 | Fateh |
| 2016/0360180 | A1 | 12/2016 | Cole et al. |

OTHER PUBLICATIONS

"Parameter Values for the HDTV Standards for Production and International Programme Exchange", Recommendation ITU-R BT.709, Apr. 2002, 32 pages.

Schulzrinne et al., "RTP: A Transport Protocol for Real-Time Applications", RFC 3550, Network Working Group, Jul. 2003, pp. 1-89.

Office action received for corresponding Finnish Patent Application No. 20165948, dated Jun. 14, 2017, 10 pages.

Zare et al., "HEVC-Compliant Tile-Based Streaming of Panoramic Video for Virtual Reality Applications", Proceedings of the 2016 ACM on Multimedia Conference, Oct. 15-19, 2016, pp. 601-605.

Office action received for corresponding Finnish Patent Application No. 20165950, dated Jul. 7, 2017, 9 pages.

Ekmekcioglu et al., "Visual Attention Model Aided Non-Uniform Asymmetric Coding of Stereoscopic Video", IEEE Journal of Selected Topics in Signal Processing, vol. 8, No. 3, Jun. 2014, pp. 402-414.

Sreedhar, "Multiview Video Coding for Virtual Reality", Thesis, Apr. 2016, 69 pages.

Extended European Search Report received for corresponding European Patent Application No. 17203955.4, dated Jan. 10, 2018, 6 pages.

Rerabek et al., "JPEG Backward Compatible Coding of Omnidirectional Images", Proc. SPIE, Applications of Digital Image Processing XXXIX, vol. 9971, Sep. 28, 2016, 12 pages.

Maze et al., "Quality Adaptation for Tile Based Streaming in DASH", ISO/IEC JTC1/SC29/WG 11 MPEG2016/M39255, 116th MPEG Meeting, Canon Research Centre, Oct. 2016, 4 pages.

Champel et al., "Key Factors for a High-Quality VR Experience", Proc. SPIE, Applications of Digital Image Processing XL, vol. 10396, Sep. 19, 2017, 12 pages.

Gudumasu et al., "Segment Scheduling Method for Reducing 360° Video Streaming Latency", Proc. SPIE, Applications of Digital Image Processing XL, vol. 10396, Sep. 19, 2017, 13 pages.

Non-Final Office action received for corresponding U.S. Appl. No. 15/832,465, dated Nov. 1, 2018, 12 pages.

Non-Final Office action received for corresponding U.S. Appl. No. 15/831,274, dated Jul. 11, 2019, 12 pages.

Notice of Allowance received for corresponding U.S. Appl. No. 15/831,274, dated Nov. 4, 2019, 10 pages.

* cited by examiner

Fig. 8

METHOD AND AN APPARATUS AND A COMPUTER PROGRAM PRODUCT FOR VIDEO ENCODING AND DECODING

CLAIM OF PRIORITY

The present application is a divisional of allowed U.S. patent application Ser. No. 15/831,274, entitled "METHOD AND AN APPARATUS AND A COMPUTER PROGRAM PRODUCT FOR VIDEO ENCODING AND DECODING" filed on Dec. 4, 2017, which claims priority benefit to FI patent application No. 20165948, filed on Dec. 9, 2016, the disclosure of which is hereby incorporated by reference in its entirety.

TECHNICAL FIELD

The present solution generally relates to encoding and decoding.

BACKGROUND

Since the beginning of photography and cinematography, the most common type of image and video content has been captured by cameras with relatively narrow field of view, and displayed as a rectangular scene on flat displays. More recently, new image and video capture devices are available, which are able to capture visual and audio content all around them. Such content is referred to as 360-degree image/video.

Furthermore, new types of output technologies have been invented and produced, such as head-mounted displays. These devices allow a person to see visual content all around him/her. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for reducing data transmission rates needed for virtual reality content. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising obtaining a picture sequence; selecting a first spatial region and a second spatial region within a picture area of pictures of the picture sequence, the second spatial region differing from the first spatial region; obtaining a first spatial region sequence, the first spatial region sequence comprising the first spatial region of the pictures of the picture sequence; obtaining a second spatial region sequence, the second spatial region sequence comprising the second spatial region of the pictures of the picture sequence; transmitting the first spatial region sequence at a first picture rate; and transmitting the second spatial region sequence at a second picture rate, the first picture rate being different from the second picture rate.

According to an embodiment, a method further comprises receiving viewport information, wherein the viewport information comprises one or both of the following: first viewport parameters of a prevailing viewport; second viewport parameters of one or more expected viewports; and selecting the first spatial region based on the received viewport information.

According to an embodiment, a method further comprises transmitting the first spatial region sequence over a first transmission channel; and transmitting the second spatial region sequence over a second transmission channel, wherein the first transmission channel is different from the second transmission channel.

According to an embodiment, the first picture rate is greater than the second picture rate, wherein the method further comprises forming a first sub-sequence of the first spatial region sequence at the second picture rate, wherein the pictures of the first sub-sequence are temporally aligned with the pictures of the second spatial region sequence; forming a second sub-sequence of the first spatial region sequence comprising all pictures not in the first sub-sequence; transmitting the first sub-sequence over a first transmission channel; transmitting the second sub-sequence over a second transmission channel, the second transmission channel differing from the first transmission channel; transmitting the second spatial region sequence over the first transmission channel or a third transmission channel, the third transmission channel differing from the second transmission channel.

According to an embodiment, a method further comprises selecting the second spatial region based on the received viewport information.

According to an embodiment, a method further comprises selecting the second spatial region based on a movement margin added to the first spatial region or the first viewport parameters.

According to an embodiment, a method further comprises obtaining the picture sequence through video encoding.

According to an embodiment, the video encoding comprises encoding a first bitstream comprising the first spatial region sequence at the first picture rate; and encoding a second bitstream comprising the second spatial region sequence at the second picture rate, the second bitstream being decodable independently of the first bitstream.

According to an embodiment, the video encoding comprises encoding a first spatial region and a second spatial region as a first single picture when they are temporally aligned; encoding a first spatial region and blocks marked as non-coded as a second single picture when no second spatial region is temporally aligned with the first spatial region.

According to an embodiment, the video encoding comprises encoding the first spatial region sequence as a first scalable layer of a bitstream; encoding the second spatial region sequence as a second scalable layer of the bitstream.

According to an embodiment, the first picture rate is greater than the second picture rate, wherein the method further comprises receiving gaze position information; selecting the second spatial region as a fovea region based on the received gaze position information, the fovea region being a subset of the first spatial region; encoding the first spatial region sequence at a first sampling density, a first picture quality, a first bit-depth, a first dynamic range, and a first color gamut; encoding the second spatial region sequence at a second sampling density, a second picture quality, a second bit-depth, a second dynamic range, and a second color gamut, wherein at least one of the second sampling density, the second picture quality, the second bit-depth, the second dynamic range, and the second color gamut is greater than the first sampling density, the first picture quality, the first bit-depth, the first dynamic range, and the first color gamut.

According to an embodiment, a method further comprises receiving the first spatial region sequence at the first picture rate; receiving a received second spatial region sequence at the first picture rate; selecting a temporal subset at the second picture rate of the received second spatial region sequence; and transmitting the temporal subset as the second spatial region sequence at the second picture rate.

According to a second aspect, there is provided an apparatus comprising at least one processor, memory including computer program code, the memory and the computer program code configured to, with the at least one processor, cause the apparatus to perform a method according to any of the above embodiments.

According to a third aspect, there is provided a computer program product embodied on a non-transitory computer readable medium, comprising computer program code configured to, when executed on at least one processor, cause an apparatus or a system to implement a method according to any of the above embodiments.

According to a fourth aspect, there is provided a method comprising decoding a first spatial region sequence at a first picture rate; decoding a second spatial region sequence at a second picture rate; wherein the second spatial region is different from the first spatial region and the first picture rate is greater than the second picture rate; obtaining first viewport parameters of a viewport; in response to the first spatial region covering the viewport, displaying at least a first subset of the decoded first spatial region sequence;

in response to the first spatial region not covering the viewport, forming a combination of the decoded first spatial region sequence and the second spatial region sequence, and displaying at least a second subset of said combination.

According to an embodiment, the viewport is one of a following: a display viewport; a visible viewport.

According to an embodiment, the viewport is one of a following: a prevailing viewport; an expected viewport, wherein the expected viewport accounts for head and/or gaze movement possibly taking place.

According to an embodiment, the forming of the combination comprises decreasing a picture rate of the first spatial region sequence to be the same as the second picture rate, or increasing a picture rate of the second spatial region sequence to be the same as the first picture rate.

According to an embodiment, the forming of the combination comprises decreasing a picture rate of the first spatial region sequence to be a third picture rate; and increasing a picture rate of the second spatial region sequence to be the third picture rate.

According to an embodiment, the video decoding comprises decoding a first bitstream comprising the first spatial region sequence at the first picture rate; and decoding a second bitstream comprising the second spatial region sequence at the second picture rate.

According to an embodiment, the video decoding comprises decoding a first spatial region and a second spatial region as a first single picture when they are temporally aligned; decoding a first spatial region and blocks marked as non-coded as a second single picture when no second spatial region is temporally aligned with the first spatial region.

According to an embodiment, the video decoding comprises decoding the first spatial region sequence from a first scalable layer of a bitstream; decoding the second spatial region sequence from a second scalable layer of the bitstream.

According to a fifth aspect, there is provided an apparatus comprising at least one processor, memory including computer program code, the memory and the computer program code configured to, with the at least one processor, cause the apparatus to perform a method according any of the embodiments of the fourth aspect.

According to a sixth aspect, there is provided computer program product embodied on a non-transitory computer readable medium, comprising computer program code configured to, when executed on at least one processor, cause an apparatus or a system to implement a method according any of the embodiments of the fourth aspect.

DESCRIPTION OF THE DRAWINGS

In the following, various embodiments of the invention will be described in more detail with reference to the appended drawings, in which

Figure 8:
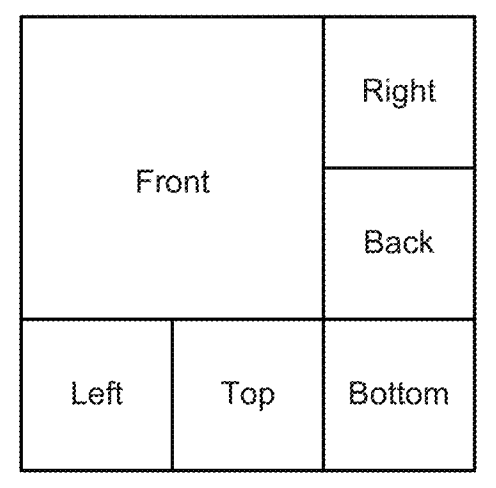

FIG. 8 shows an example of a packed virtual reality (VR) frame;

DETAILED DESCRIPTION

The present embodiments aim to reduce the data rates needed for virtual reality content. The present embodiments are suitable for low-latency high-bandwidth transmission channels, such as cable and wireless local connections and 5G mobile networks, where inter-picture prediction may not be used or used only in limited fashion. However, the teachings of the present embodiments may be applied to higher-latency and/or lower-bandwidth transmission channels too.

Virtual reality video content requires a high bandwidth for example because the spatial resolution should be high to achieve high enough spatial fidelity. For example, some head-mounted displays (HMD) currently use quad-HD (quad High Definition) panels (2560×1440). It is also assumed that the HMD panels may reach 8K resolution (e.g. 7680×4320) for example within five years. High bandwidth is required also because the temporal resolution should be high to achieve quick enough response to head movements. For example, it is recommended to use the same or greater frame rate as the display refresh rate. Even higher display refresh rates and similarly frame rates are desirable.

Figure 1:
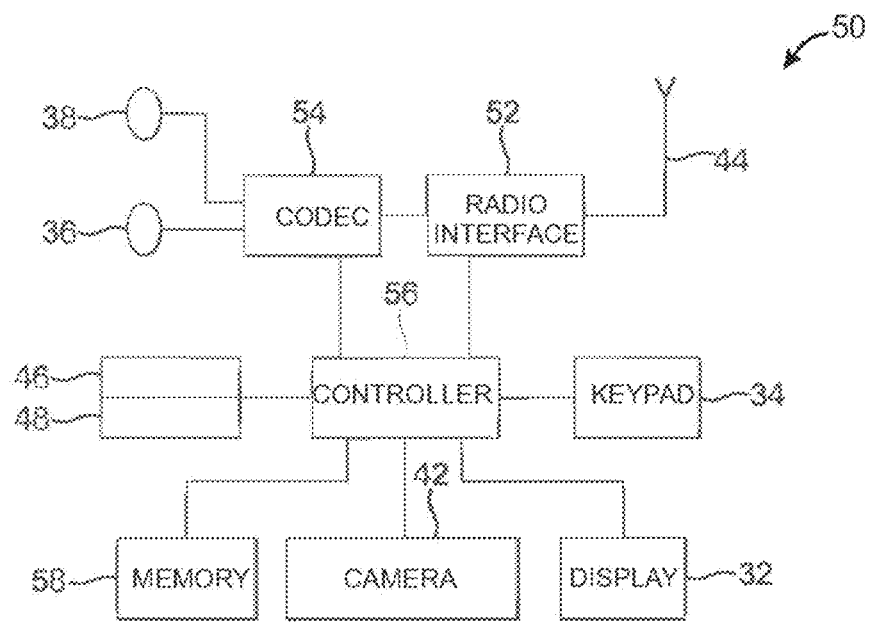
FIG. 1 shows an apparatus according to an embodiment in a simplified block chart.
Figure 2:
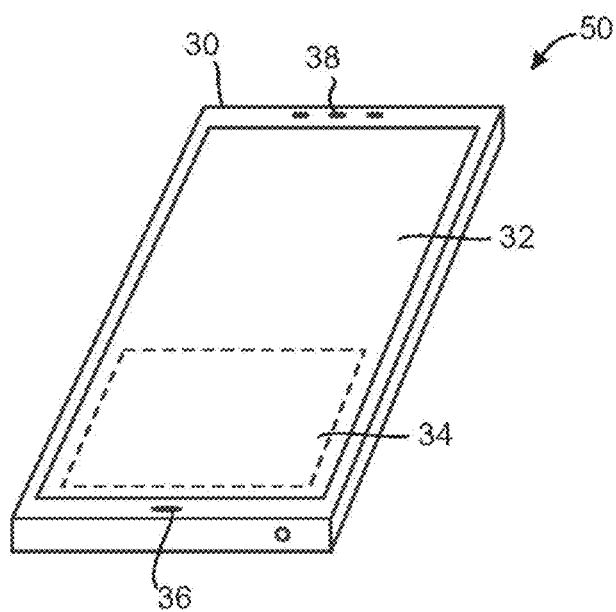
FIG. 2 shows a layout of an apparatus according to an embodiment.

Before describing the present solution in more detailed manner, an apparatus according to an embodiment is disclosed with reference to FIGS. 1 and 2.

FIG. 1 shows a block diagram of a video coding system according to an example embodiment as a schematic block diagram of an electronic device 50, which may incorporate a codec. In some embodiments the electronic device may comprise an encoder or a decoder. FIG. 2 shows a layout of an apparatus according to an embodiment. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device.

The apparatus 50 may comprise a housing 30 for incorporating and protecting the device. The apparatus 50 may further comprise a display 32 in the form of a liquid crystal display. In other embodiments of the invention the display may be any suitable display technology suitable to display an image 30 or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may further comprise an infrared port for short range line of sight communication to other devices. According to an embodiment, the apparatus may further comprise any suitable short range communication solution such as for example a Bluetooth wireless connection or a USB (Universal Serial Bus)/firewire wired connection.

The apparatus 50 may comprise a controller 56 or processor for controlling the apparatus 50. The apparatus or controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The 30 apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection. Such wired interface may be configured to operate according to one or more digital display interface standards, such as for example High-Definition Multimedia Interface (HDMI), Mobile High-definition Link (MHL), or Digital Visual Interface (DVI). The apparatus may be configured to encode and/or decode the received data according to at least one of these protocols.

Figure 3:
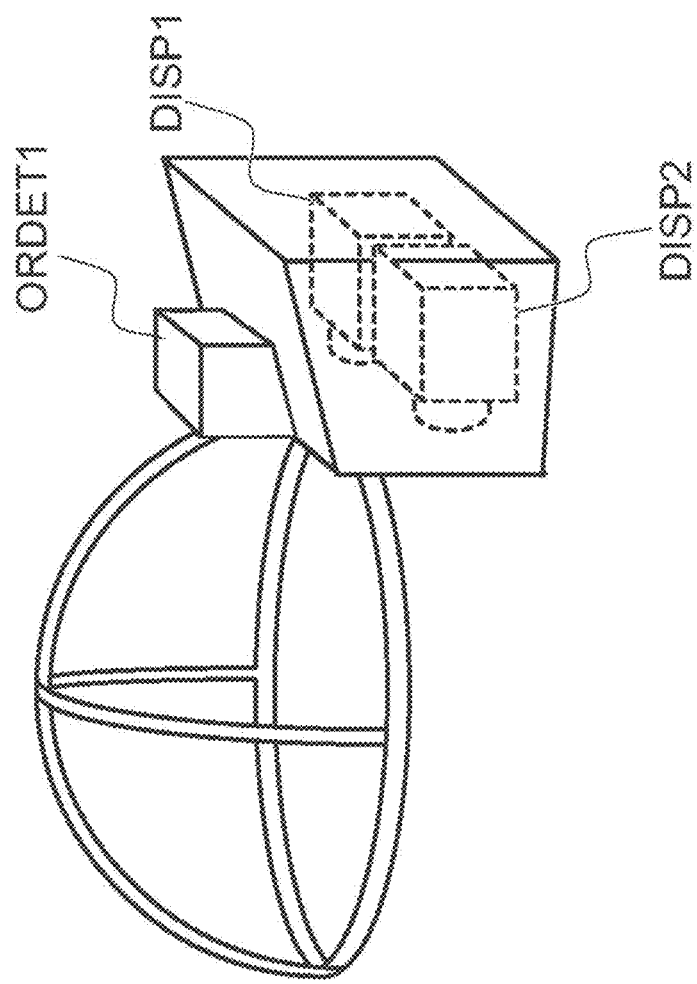
FIG. 3 shows a display device according to an embodiment.

An apparatus according to another embodiment is disclosed with reference to FIG. 3. FIG. 3 shows a block diagram of a video decoding system according to an example embodiment as a schematic block diagram of an electronic device. The video decoding system of FIG. 3 is a head-mounted display for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have orientation detecting circuitry ORDET1 for determining the head movements and direction of the head. Output of the orientation detecting circuitry may be used for estimating user's gaze direction, or, the device may comprise gaze detection circuitry for this purpose. The head-mounted display gives a three-dimensional (3D) perception of the recorded/streamed content to a user.

A video codec comprises an encoder that transforms an input video into a compressed representation suited for storage/transmission and a decoder that can uncompress the compressed video representation back into a viewable form. The encoder may discard some information in the original video sequence in order to represent the video in a more compact form (that is, at lower bitrate). An image codec or a picture codec is similar to a video codec but encodes each input picture independently from other input pictures and decodes each coded picture independently from other coded pictures. It needs to be understood that whenever a video codec, video encoding or encoder, or video decoder or decoding is referred below, the text similarly applies to an image codec, image encoding or encoder, or image decoder or decoding, respectively.

A picture given as an input to an encoder may also referred to as a source picture, and a picture decoded by a decoded may be referred to as a decoded picture. The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).

Arrays representing other unspecified monochrome or tri-stimulus color samplings (for example, YZX, also known as XYZ).

Term pixel may refer to the set of spatially collocating samples of the sample arrays of the color components. Sometimes, depending on the context, term pixel may refer to a sample of one sample array only.

In the following, these arrays may be referred to as luma (or L or Y) and chroma, where the two chroma arrays may be referred to as Cb and Cr; regardless of the actual color representation method in use. The actual color representation method in use can be indicated e.g. in a coded video bitstream. A component may be defined as an array or single sample from one of the three sample arrays (luma and two chroma) or the array or a single sample of the array that compose a picture in monochrome format.

In some coding systems, a picture may either be a frame or a field, while in some coding systems a picture may be constrained to be a frame. A frame comprises a matrix of luma samples and possibly the corresponding chroma samples. A field is a set of alternate sample rows of a frame and may be used as encoder input, when the source signal is interlaced. A video comprises a plurality of frames or fields that are sequentially displayed to the user. The number of frames or fields displayed during a time interval may be defined as the frame rate or field rate, respectively. Picture rate may be defined as frame rate or field rate according to the type of pictures in the video. A frame rate may be for example equal to 60 frames per second (fps).

Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

Spatial resolution of a picture may be defined as the number of pixels or samples representing the picture in horizontal and vertical direction. Alternatively, depending on the context, spatial resolution of a first picture may be defined to be the same as that of a second picture, when their sampling grids are the same, i.e. the same sampling interval is used both in the first picture and in the second picture. The latter definition may be applied for example when the first picture and the second picture cover different parts of a picture.

In some coding arrangements luma and chroma sample arrays are coded in an interleaved manner, e.g. interleaved block-wise. In some coding arrangements, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

Video encoders may encode the video information in two phases.

Firstly, pixel values in a certain picture area (or "block") are predicted. The prediction may be performed for example by motion compensation means (finding and indicating an area in one of the previously coded video frames that corresponds closely to the block being coded), which may be referred to as inter prediction or inter-picture prediction. Alternatively or in addition, the prediction may be performed for example by spatial means (using the pixel values around the block to be coded in a specified manner), which may be referred to as intra prediction or spatial prediction. In some coding arrangements, prediction may be absent or the prediction signal may be pre-defined (e.g. a zero-valued block).

Secondly, the prediction error, i.e. the difference between the predicted block of pixels and the original block of pixels, is coded. This may done for example by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In another example, pixel values are coded without transforming them for example using differential pulse code modulation and entropy coding, such as Huffman coding or arithmetic coding.

Figure 4:
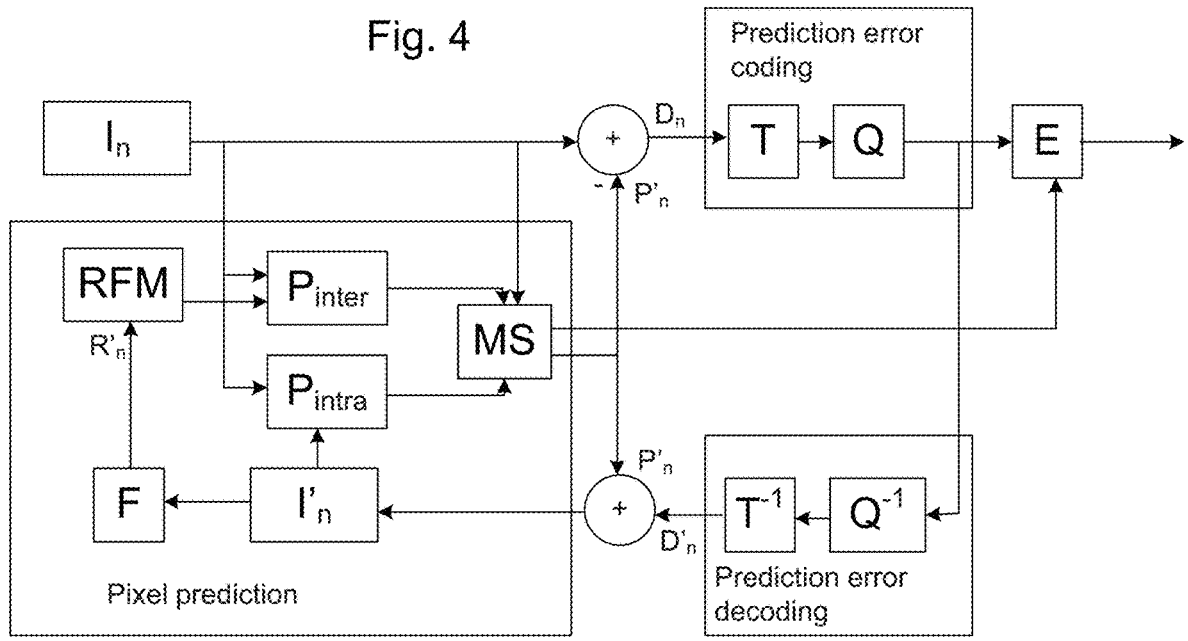
FIG. 4 shows an encoder according to an embodiment.
Figure 5:
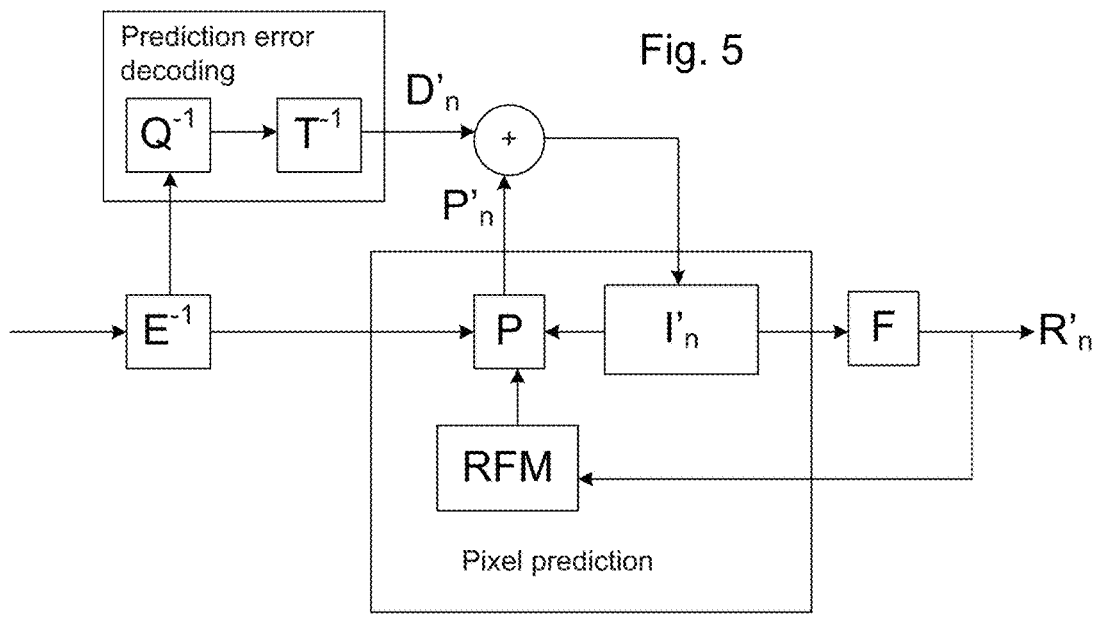
FIG. 5 shows a decoder according to an embodiment.

An example of an encoding process is illustrated in FIG. 4. FIG. 4 illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F). An example of a decoding process is illustrated in FIG. 5. FIG. 5 illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

In signal processing, resampling of images is usually understood as changing the sampling rate of the current image in horizontal or/and vertical directions. Resampling results in a new image which is represented with different number of pixels in horizontal or/and vertical direction. In some applications, the process of image resampling is equal to image resizing. In general, resampling is classified in two processes: downsampling and upsampling.

Downsampling or subsampling process may be defined as reducing the sampling rate of a signal, and it typically results in reducing of the image sizes in horizontal and/or vertical directions. In image downsampling, the spatial resolution of the output image, i.e. the number of pixels in the output image, is reduced compared to the spatial resolution of the input image. Downsampling ratio may be defined as the horizontal or vertical resolution of the downsampled image divided by the respective resolution of the input image for downsampling. Downsampling ratio may alternatively be defined as the number of samples in the downsampled image divided by the number of samples in the input image for downsampling. As the two definitions differ, the term downsampling ratio may further be characterized by indicating whether it is indicated along one coordinate axis or both coordinate axes (and hence as a ratio of number of pixels in the images). Image downsampling may be performed for example by decimation, i.e. by selecting a specific number of pixels, based on the downsampling ratio, out of the total number of pixels in the original image. In some embodiments downsampling may include low-pass filtering or other filtering operations, which may be performed before or after image decimation. Any low-pass filtering method may be used, including but not limited to linear averaging.

Upsampling process may be defined as increasing the sampling rate of the signal, and it typically results in increasing of the image sizes in horizontal and/or vertical directions. In image upsampling, the spatial resolution of the output image, i.e. the number of pixels in the output image, is increased compared to the spatial resolution of the input image. Upsampling ratio may be defined as the horizontal or vertical resolution of the upsampled image divided by the respective resolution of the input image. Upsampling ratio may alternatively be defined as the number of samples in the upsampled image divided by the number of samples in the input image. As the two definitions differ, the term upsampling ratio may further be characterized by indicating whether it is indicated along one coordinate axis or both coordinate axes (and hence as a ratio of number of pixels in the images). Image upsampling may be performed for example by copying or interpolating pixel values such that the total number of pixels is increased. In some embodiments, upsampling may include filtering operations, such as edge enhancement filtering.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability. ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exist several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

Interlaced-to-progressive scalability (also known as field-to-frame scalability): coded interlaced source content material of the base layer is enhanced with an enhancement layer to represent progressive source content.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures.

It should be understood that many of the scalability types may be combined and applied together.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

The spatial correspondence of a reference-layer picture and an enhancement-layer picture may be inferred or may be indicated with one or more types of so-called reference layer location offsets. Reference layer location offsets may be used for but are not limited to achieving region-of-interest (ROI) scalability. Reference layer location offsets may be indicated between two layers or pictures of two layers even if the layers do not have an inter-layer prediction relation between each other. Reference layer location offsets may comprise one or more of: scaled reference layer offsets, reference region offsets, and resampling phase sets. Scaled reference layer offsets may be considered to specify the horizontal and vertical offsets between the sample in the current picture that is collocated with the top-left luma sample of the reference region in a decoded picture in a reference layer and the horizontal and vertical offsets between the sample in the current picture that is collocated with the bottom-right luma sample of the reference region in a decoded picture in a reference layer. Another way is to consider scaled reference layer offsets to specify the positions of the corner samples of the upsampled reference region (or more generally, the resampled reference region) relative to the respective corner samples of the enhancement layer picture. The scaled reference layer offsets can be considered to specify the spatial correspondence of the current layer picture (for which the reference layer location offsets are indicated) relative to the scaled reference region of the scaled reference layer picture. The scaled reference layer offset values may be signed and are generally allowed to be equal to 0. When scaled reference layer offsets are negative, the picture for which the reference layer location offsets are indicated corresponds to a cropped area of the reference layer picture. Reference region offsets may be considered to specify the horizontal and vertical offsets between the top-left luma sample of the reference region in the decoded picture in a reference layer and the top-left luma sample of the same decoded picture as well as the horizontal and vertical offsets between the bottom-right luma sample of the reference region in the decoded picture in a reference layer and the bottom-right luma sample of the same decoded picture. The reference region offsets can be considered to specify the spatial correspondence of the reference region in the reference layer picture relative to the decoded reference layer picture. The reference region offset values may be signed and are generally allowed to be equal to 0. When reference region offsets are negative, the reference layer picture corresponds to a cropped area of the picture for which the reference layer location offsets are indicated. A resampling phase set may be considered to specify the phase offsets used in resampling process of a source picture for inter-layer prediction. Different phase offsets may be provided for luma and chroma components.

The phrase along the bitstream (e.g. indicating along the bitstream) may be used in claims and described embodiments to refer to transmission, signaling, or storage in a manner that the data is associated with but not included in the bitstream, such as a coded video bitstream. For example, a signaling protocol may be used for transmitting data along the bitstream.

As used herein, an orientation (such as an orientation of a viewport, for example) and/or a spherical or spatial location may be represented by angular coordinates of a coordinate system. Angular coordinates may, for example, be called yaw, pitch, and roll, indicating the rotation angles around certain coordinate axes, such as y, x and z, respectively. Yaw, pitch, and roll may be used, for example, to indicate an orientation of a viewport. In some contexts, viewport orientation may be constrained; for example, roll may be constrained to be 0. In some such examples, and in other examples, yaw and pitch indicate the Euler angle of the center point of the viewport in degrees. In most contexts, yaw is applied prior to pitch, such that yaw rotates around the Y-axis, and pitch around the X-axis. Likewise, in most contexts, the angles increase clockwise as viewed when looking away from the origin.

In the present application, terms "360-degree video" or "virtual reality (VR) video" may be used interchangeably. The terms generally refers to video content that provides such a large field of view that only a part of the video is displayed at a single point of time in typical displaying arrangements. For example, VR video may be viewed on a head-mounted display (HMD) (as the one shown in FIG. 3) that may be capable of displaying e.g. about 100-degree field of view. The spatial subset of the VR video content to be displayed may be selected based on the orientation of the HMD. In a conventional flat-panel viewing environment, which represents another example of the viewing environment, e.g. up to 40-degree field of view may be displayed. When displaying wide field of view content (e.g., fisheye) on such flat-panel display, a spatial subset of the picture may be displayed instead of the entire picture. In such example, the displayed spatial subset of the VR video content may be selected based on the orientation of the device used for the viewing, or the device may enable content panning, e.g., by providing basic user interface (UI) controls for the user.

Figure 6:
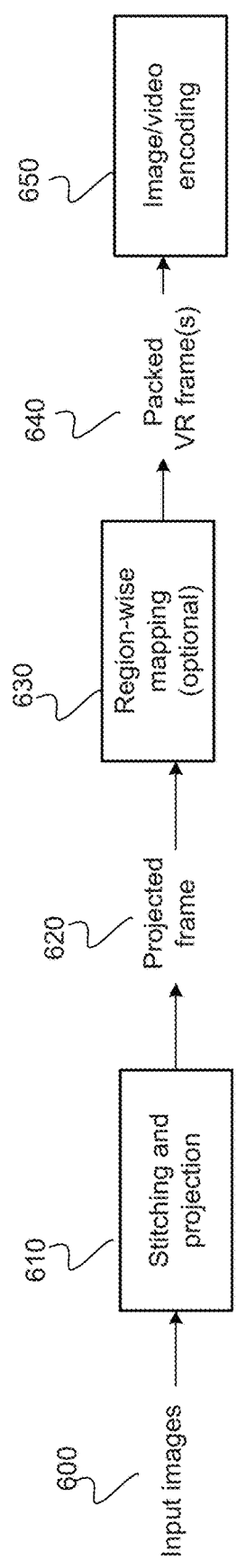
FIG. 6 shows an example of preparation of 360-degree image/video content.

360-degree image or video content may be acquired and prepared for example as follows. Images or video can be captured by a set of cameras or a camera device with multiple lenses and sensors. The acquisition results in a set of digital image/video signals. The cameras/lenses may cover all directions around the center point of the camera set or the camera device. The images of the same time instance are stitched, projected, and mapped onto a packed VR frame. FIG. 6 illustrates an example of such process. At first, input images 600 are obtained from a camera device. These input images are stitched and projected 610 onto a three-dimensional projection structure, such as a sphere or a cube. The projection structure may be considered to comprise one or more surfaces, such as plane(s) or part(s) thereof. The projection structure may be defined as three-dimensional structure consisting of one or more surface(s) on which the captured VR image/video content is projected, and from which a respective projected frame can be formed. The image data on the projection structure is further arranged onto a two-dimensional projected frame 620. The term projection may be defined as a process by which a set of input images are projected onto a projected frame. There may be a pre-defined set of representation formats of the projected frame, including for example an equirectangular panorama and a cube map representation format.

Region-wise mapping 630 may optionally be applied to map projected frame onto one or more packed VR frames 640. In some cases, region-wise mapping is understood to be equivalent to extracting two or more regions from the projected frame, optionally applying a geometric transformation (such as rotating, mirroring, and/or resampling) to the regions, and placing the transformed regions in spatially non-overlapping areas, a.k.a. constituent frame partitions, within the packed VR frame. If the region-wise mapping is not applied, the packed VR frame is identical to the projected frame. Otherwise, regions of the projected frame are mapped onto a packed VR frame by indicating the location, shape, and size of each region in the packed VR frame. The term mapping may be defined as a process by which a projected frame is mapped to a packed VR frame. The term packed VR frame may be defined as a frame that results from a mapping of a projected frame. In practice, the input images may be converted to a packed VR frame in one process without intermediate steps. The packed VR frame(s) are then provided for image/video encoding 650.

Figure 7:
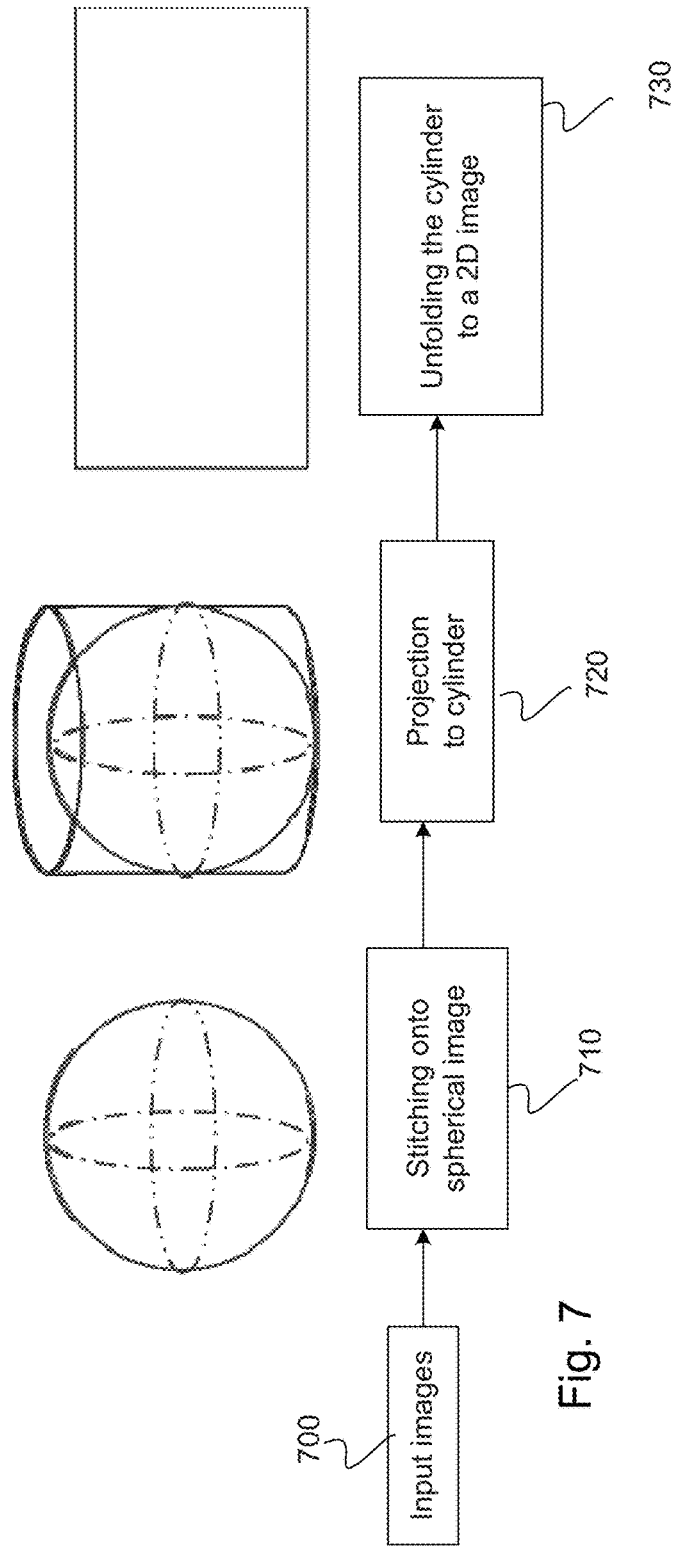
FIG. 7 shows an example of a process of forming a monoscopic equirectangular panorama picture.

360-degree panoramic content (i.e., images and video) cover horizontally the full 360-degree field of view around the capturing position of a camera device. The vertical field of view may vary and can be e.g., 180 degrees. Panoramic image covering 360-degree field of view horizontally and 180-degree field of view vertically can be represented by a sphere that has been mapped to a two-dimensional image plane using equirectangular projection. In this case, the horizontal coordinate may be considered equivalent to a longitude, and the vertical coordinate may be considered equivalent to latitude, with no transformation or scaling applied. The process of forming a monoscopic equirectangular panorama picture is illustrated in the FIG. 7. A set of input images 700, such as fisheye images of a camera array or from a camera device with multiple lenses and sensors, is cross blended or stitched 710 onto a spherical image (equidistant projection). The spherical image is further projected onto a cylinder 720 (without the top and bottom faces). The cylinder is unfolded to form a two-dimensional projected frame 730. In practice one or more of the presented steps may be merged; for example, the input images may be directly projected onto a cylinder without an intermediate projection onto a sphere. The projection structure for equirectangular panorama may be considered to be a cylinder that comprises a single surface. Similarly, stereoscopic equirectangular panorama pictures can be formed from a set of input images for the left and right eyes. In stereoscopic equirectangular panoramas the upper part of the panorama may be the left-eye images, and the lower part of the panorama may be the right-eye image.

In general, 360-degree content can be mapped onto different types of solid geometrical structures, such as polyhedron (i.e., a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto sphere first), cone, etc. and then unwrapped to a two-dimensional image plane.

In some cases panoramic content with 360-degree horizontal field of view but with less than 180-degree vertical field of view may be considered special cases of equirectangular projection, where the polar areas of the sphere have not been mapped onto the two-dimensional image plane. In some cases a panoramic image may have less than 360-degree horizontal field of view and up to 180-degree vertical field of view, while otherwise has the characteristics of equirectangular projection format.

The human eyes are not capable of viewing the whole 360-degree space, but are limited to a maximum horizontal and vertical Field of Views (FoVs, Human eye Horizontal FoV (HHFoV); Human eye Vertical FoV (HVFov)). Also, a HMD device has a technical limitations that allow only viewing a subset of the whole 360 degrees spaces in horizontal and vertical directions (Device Horizontal FoV (DHFoV); Device Vertical FoV (DVFoV)).

At any point of time, a video rendered by an application on a HMD renders a portion of the 360 degrees video. This portion if defined in this application as "viewport" or "display viewport". A viewport is a window on the 360-degree world represented in the omnidirectional video displayed via a rendering display. A viewport may be characterized by horizontal and vertical FoVs (Viewport Horizontal FoV (VHFoV); Viewport Vertical FoV (VVFoV)). In the following, VHFoV and VVFoV will be simply abbreviated with HFoV and VFoV.

A viewport size may correspond to the HMD FoV, or may have smaller or larger size, depending on the application. For the sake of clarity, a part of the 360 degrees space viewed by a user at any given point of time is referred as a "primary viewport".

One method to reduce the streaming bitrate of VR video is viewport adaptive streaming (a.k.a. viewport dependent delivery). In such streaming a subset of 360-degree video content covering the primary viewport (i.e., the current view orientation) is transmitted at the best quality/resolution, while the remaining of 360-degree video is transmitted at a lower quality/resolution. There are generally two approaches for viewport-adaptive streaming:

1) Viewport-specific encoding and streaming, a.k.a. viewport-dependent encoding and streaming, a.k.a. asymmetric projection, a.k.a. packed VR video. In this approach, 360-degree image content is packed into the same frame with an emphasis (e.g., greater spatial area) on the primary viewport. The packed VR frames are encoded into a single bitstream. For example, the front face of a cube map may be sampled with a higher resolution compared to other cube faces, and the cube faces may be mapped to the same packed VR frame as shown in FIG. 8.

2) VR viewport video, a.k.a. tile-based encoding and streaming. In this approach, 360-degree content is encoded and made available in a manner that enables selective streaming of viewports from different encodings. For example, each cube face may be separately encoded. More than one encoded bitstream for each cube face may be provided, e.g. each with different spatial resolution. Players can choose bitstreams to be decoded and played based on the current viewing orientation. High-resolution tracks (or Representations) may be selected for the cube faces used for rendering for the present viewing orientation, while the remaining cube faces may be obtained from their low-resolution bitstreams.

It is possible to combine the approaches 1) and 2) above.

The 360 degrees space can be assumed to be divided into a discrete set of viewports, each separated by a given distance (e.g., expressed in degrees), so that the omnidirectional space can be imagined as a map of overlapping viewports, and the primary viewport is switched discretely as the user changes his/her orientation while watching content with a HMD. When the overlapping between viewports is reduced to zero, the viewports could be imagined as adjacent non-overlapping tiles within the 360 degrees space.

Video interface that may be used by the head mounted displays is HMDI, a serial interface where the video information in transmitted in three TMDS channels (RGB, YCbCr) as Video Data Periods. in another video interface, superMHL, there are more (6 to 8) TMDS channels, which can be used in a more flexible way to transmit video and other data, the main difference being that MHL transmits RGB (or YCbCr) information of a pixel sequentially over the one TMDS channel.

transmission channel or a communication channel or a channel may refer to either a physical transmission medium, such as a wire, or to a logical connection over a multiplexed medium. Examples of channels comprise lanes in video interface cables and a Real-Time Transport Protocol (RTP) stream.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

As mentioned, virtual reality video content requires a high bandwidth. Viewport-dependent methods as described above in the context of streaming may be used also in for "local" transmission of virtual reality video over a cable connection or a local wireless connection. However, the bitrates remain to be very high and challenging for cable and wireless connections. For example, the raw data rate of 7680×4320 8-bit pictures at 90 Hz is more than 71 Gbps.

The round-trip delay from the video processing device (e.g. PC processing the video for rendering) and the display device (e.g. HMD), including all the processing steps, may be higher than the display refresh rate and correspondingly the frame rate. Consequently, the intended viewport of a picture prepared for rendering may not exactly match the prevailing display viewport when the picture is about to be displayed. Thus, even local connections may require transmission of pictures with a higher field of view than what eventually are displayed.

The compression scheme for the pictures transmitted over local display connections does not typically include inter-picture prediction to reduce the computational complexity and memory requirements in the display device. Consequently, data rates are typically proportional to the picture rate.

Possible solutions for reducing the required data rate include e.g. emphasizing the center of the image, correcting image immediately prior to display, compression, different resolutions for different eyes.

In the present solution for reducing the data rates, only a portion of the VR content (viewport) is transmitted to a display device at the highest picture rate. For example, the portion may correspond to the current HMD orientation and/or to the gaze information. The transmitted data may be divided into a plurality of regions, for example a current viewport and an expected viewport, which may be transmitted at different picture rates. The current and/or expected viewports may be determined based on received orientation and/or gaze information from the HMD.

Figure 9:
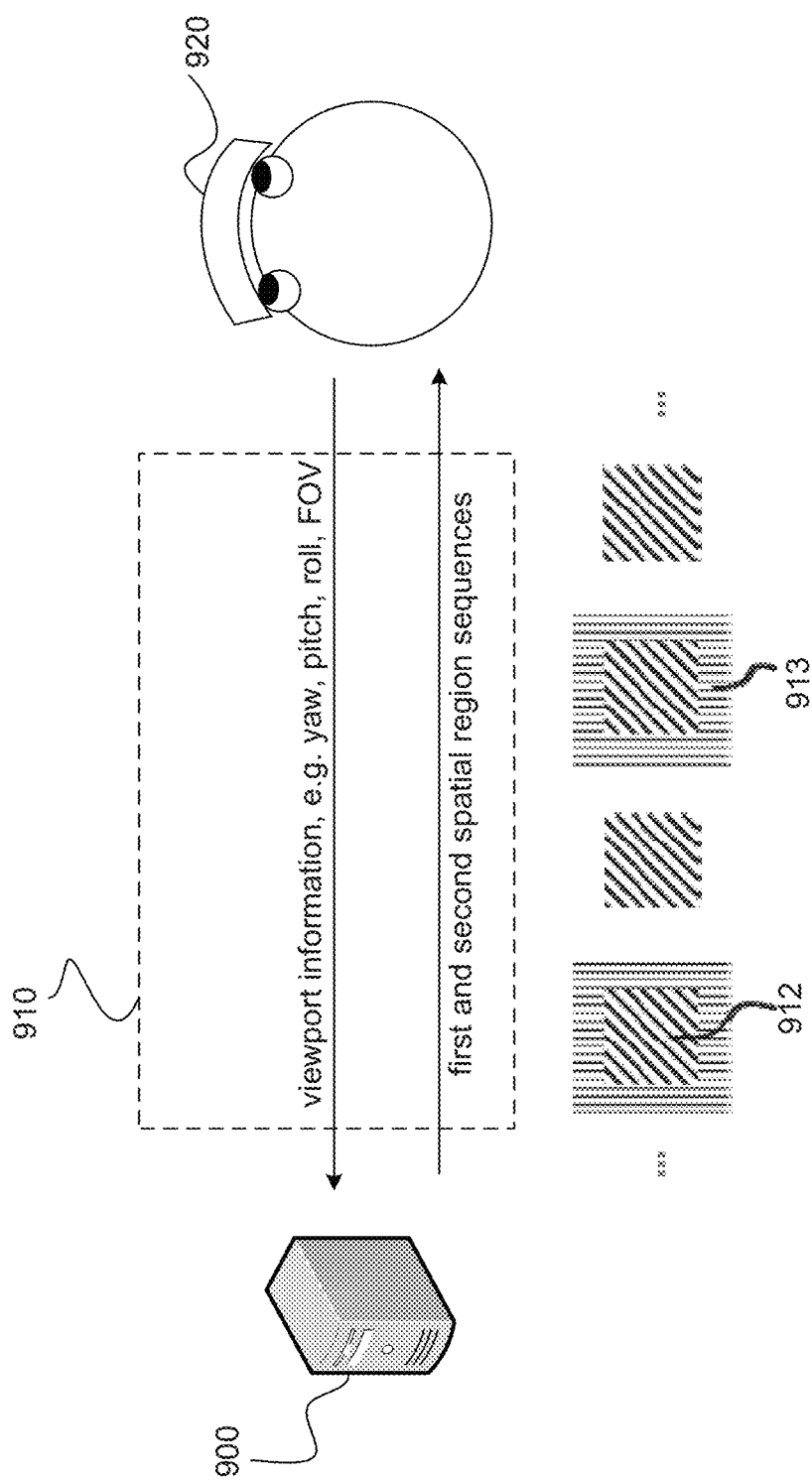
FIG. 9 shows a system according to an embodiment in a simplified manner.

FIG. 9 illustrates an example of the present solution. The content to be transmitted over a transmission channel 910 (e.g. a cable) is prepared as follows. Viewport information, such as the prevailing viewing orientation and the horizontal and/or vertical field of view of the head-mounted display 920, are received by a processing device 900. The processing device 900 also obtains a picture sequence. For example, the picture sequence may be streamed to the processing device 900.

The first spatial region 912 is selected to cover the viewport. It should be noticed that the first spatial region may cover a greater region than the display viewport. The first spatial region 912 is extracted from a picture of the picture sequence. First spatial regions are transmitted at a particular picture rate that should be as high as possible. A first spatial region sequence comprising the first spatial regions of pictures of the picture sequence is indicated with rectangles filled with diagonal stripes in FIG. 9.

The second spatial region 913 is selected in a manner that a greater field of view is covered together with the first spatial region, and no head and/or gaze movement is expected to cause a display viewport exceed the boundaries of the combined first and second spatial region. The second spatial region 913 is extracted from a picture of the picture sequence. Second spatial regions are transmitted at a lower picture rate than that of the first spatial regions. A second spatial region sequence comprising the second spatial regions of the pictures of the picture sequence is indicated with areas filled with vertical stripes in FIG. 9. In one embodiment, the first spatial regions 912 may comprise central portions of the second spatial regions 913. As an example, the picture rate of the first spatial region sequence is N times the picture rate of the second spatial region sequence, where N is a positive integer greater than 1. If the left-eye second spatial region and the right-eye spatial region of the stereoscopic content are transmitted separately, the lower picture rate may be applied only for one of those.

For example, if the second spatial region extends the picture boundary by 20% in each direction compared to the first spatial region, and if the picture rate of the second spatial region sequence is half of that of the first spatial region sequence, the reduction in the transmitted sample (i.e. pixel) rate is 24.5% relative to transmitting the both regions consistently at a high picture rate.

According to an embodiment, the picture rate of the first spatial region sequence is chosen to be equal to the picture rate of the picture sequence. According to another embodiment, the picture rate of the first spatial region sequence is chosen to be less than the picture rate of the picture sequence and may be achieved by temporal subsampling of the picture sequence. According to yet another embodiment, the picture rate of the first spatial region sequence is chosen to be greater than the picture rate of the picture sequence and may be achieved through upsampling the picture rate, which may involve for example estimating an optical flow between two pictures of the picture sequence and interpolating intermediate picture(s) in between these two pictures on the basis of the optical flow.

The display device 920 is configured to decode the first spatial region sequence and to decode the second spatial region sequence. The display device 920 further obtains first viewport parameters of a prevailing viewport. The display device 920 is further configured to render content from the decoded first spatial region sequence on the display in response to the first spatial region covering the prevailing viewport. In addition, the display device 920 is configured to form a combination of the decoded first spatial region sequence and the decoded second spatial region sequence in response to the first spatial region not covering the prevailing viewport, and to render content from the combination on the display.

Figure 10A:
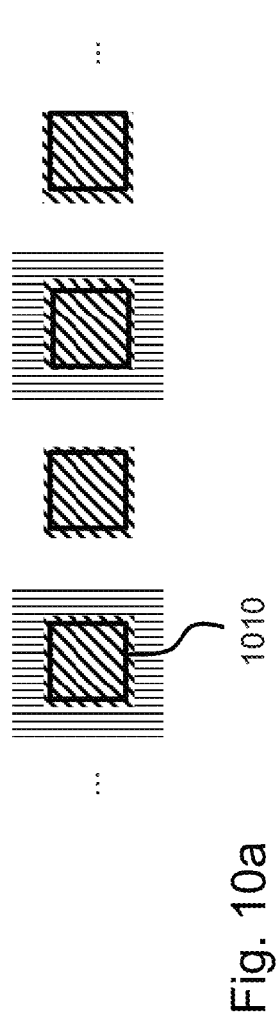
FIGS. 10a-c show examples of display viewports.
Figure 10B:
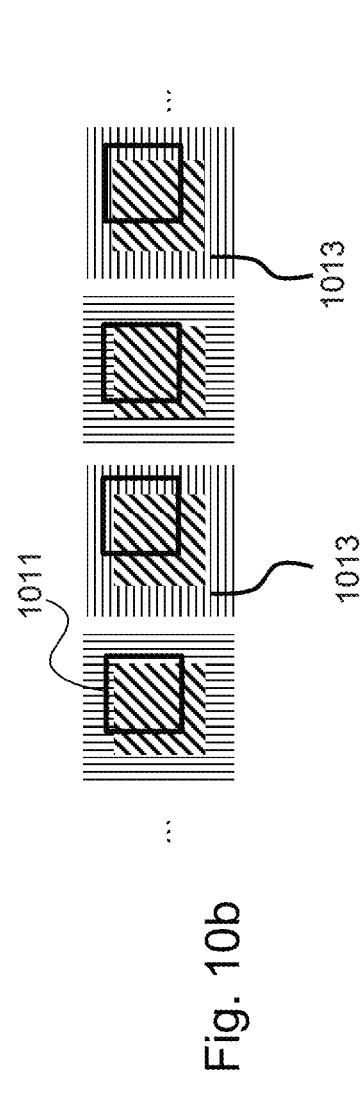
Figure 10C:

FIGS. 10a-c illustrate a spatial location of a display viewport (1010, 1011) in relation to the first and second spatial region sequence.

When the display viewport 1010 is within the first spatial region (as shown in FIG. 10a), the rendering uses samples from the first spatial region only and the rendering occurs at a high picture rate. Because the first spatial reason is slightly larger than the display viewport 1010, some movement of the display viewport 1010 can be tolerated and an image can be rendered by using samples from the first spatial region only, as illustrated in FIG. 10a.

If the display viewport 1011 is at least partly outside of the first spatial region (as shown in FIG. 10b), the display device may form estimated second spatial regions 1013 by upsampling the picture rate of the second spatial region sequence. Upsampling the picture rate may involve for example estimating an optical flow between two pictures of the second spatial region sequence and interpolating intermediate picture(s) in between these two pictures on the basis of the optical flow. Alternatively, the display device may reduce the picture rate to that used in the second spatial region sequence, as illustrated in FIG. 10c. The picture rate may be reduced for example by discarding pictures from the second spatial region sequence.

The display device may render the second spatial region sequence with lower luminance in order to reduce the probability of the noticeable flicker. The luminance may be reduced gradually across the boundary between the first and second spatial region so that no noticeable luminance or brightness edges are created.

It is appreciated that the spherical position and/or orientation of the first and second spatial regions may be functions of time.

Figure 11:
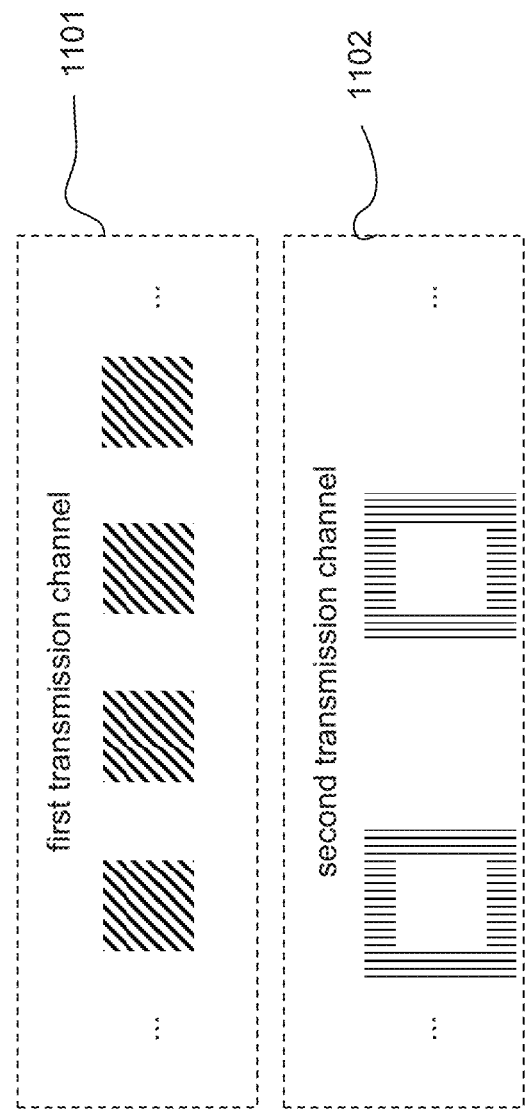
FIG. 11 shows first and second transmission channels according to an embodiment.

The first spatial region sequence may be transmitted in a first transmission channel, and the second spatial region sequence may be transmitted in a second transmission channel, wherein the second transmission channel is different from the first transmission channel. FIG. 11 illustrates the first and second transmission channels 1101, 1102. The different transmission channels for different spatial region sequences may enable the display device to omit the processing of the second transmission channel when the second spatial region is not needed for rendering the content on the display viewport. In some embodiments, the first spatial region sequence may form a first bitstream, and the second spatial region sequence may form a second bitstream, which are independently decodable and hence the first and the second transmission channels 1101, 1102 can be processed independently (e.g. until rendering).

The differing perceived quality between the first region and the second region may be achieved as follows: The first spatial region sequence may be encoded at a first sampling density, a first chroma format, a first picture quality, a first bit-depth, a first dynamic range, and/or a first color gamut. The second region sequence may be encoded at a second sampling density, a second chroma format, a second picture quality, a second bit-depth, a second dynamic range, and/or a second color gamut, wherein at least one of the first sampling density, the first chroma format, the first picture quality, the first bit-depth, the first dynamic range, and the first color gamut is greater than or provides an enhanced perceived picture quality or fidelity compared to the second sampling density, the second chroma format, the second picture quality, the second bit-depth, the second dynamic range and/or the second color gamut, respectively.

A transmission channel may for example be a lane in a cable. The first and second channels may be therefore transmitted over two separate transmission media, such as for example pins, lines, buses, or lanes of a wired interface, or, different channels of a time, frequency, space, and/or code division multiplexed radio interface. Alternatively, the first and second channels may be transmitted over different logical channels over a shared physical medium. As discussed above, transmission over separate channels enables more efficient processing at the receiving device. For example, data needed for decoding or rendering the current display viewport can be more easily accessed at the HMD. This reduces the delay of processing the plurality of spatial region sequences. Transmission over separate physical media is particularly beneficial as it enables resources to be at least semi-statically allocated to the corresponding physical media.

Figure 12:
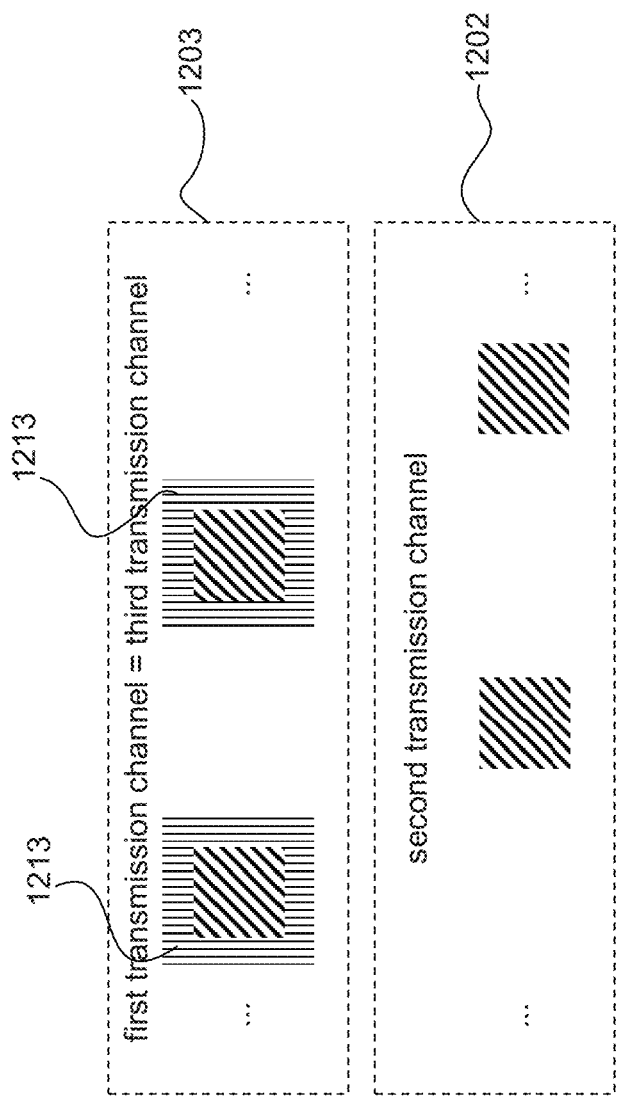
FIG. 12 shows third and second transmission channels according to an embodiment.

According to an embodiment, a first sub-sequence of the first spatial region sequence is formed, wherein the pictures of the first sub-sequence are temporally aligned with the pictures of the second spatial region sequence. A second sub-sequence of the first spatial region sequence is formed from all pictures not in the first sub-sequence. The first sub-sequence is transmitted over a first transmission channel, and the second sub-sequence is transmitted over a second transmission channel that is different from the first transmission channel. FIG. 12 shows an example where the second spatial region 1213 sequence is transmitted over a third transmission channel 1203. As shown in FIG. 12, the third transmission channel 1203 is different from the second transmission channel 1202. Further, the third transmission channel 1203 may be the same as the first transmission channel, as illustrated in FIG. 12. Alternatively, the third transmission channel may be different from the first transmission channel.

If the display viewport is at least partly outside of the first spatial region, and as a response the picture rate is reduced as explained above, only the first and the third transmission channels need to be handled, while the processing of the second transmission channel may be omitted. If the display viewport is mostly within the first spatial region, only the first and the second transmission channels need to be handled, while the processing of the third transmission channel may be omitted (provided that it is separate from the first transmission channel). In one embodiment, a display device may determine the display viewport to be in a position where data from the second transmission channel is not needed. In response, the display device may determine not to receive or process data from the second transmission channel. For example, resources allocated to receiving and/or processing the second transmission channel may be instructed to enter a low-power state, where data from the second transmission channel is not processed. For example, the display device may stop decoding and/or decapsulating data from the second transmission channel.

According to an embodiment, the first spatial region of a left view and the time-aligned first spatial region of a right view may be packed into a packed first spatial region frame. This way a sequence of packed first spatial region frames may be formed. Similarly, the second spatial region of a left view and the time-aligned second spatial region of a right view may be packed into a packed second spatial region frame, and a sequence of packed second spatial region frames may be formed. The embodiments above may then be applied to the sequence of the first spatial region frames (rather than the first spatial region sequence), and the sequence of the second spatial region frames (rather than the second spatial region sequence).

According to an embodiment, the first and second spatial region sequences of the left view may be handled with the embodiments above, and the first and second spatial region sequences of the right view may be separately handled with the embodiments above. Consequently, the data for the left and the right views are transmitted in separate transmission channels.

According to an embodiment, the first and second spatial region sequences of the left view are separate from the first and second spatial region sequences of the right view. However, the first spatial region sequences of both the left and right view may be multiplexed into the same transmission channel (as described in any embodiment above), and likewise the second spatial region sequences of both the left and right view may be multiplexed into the same transmission channel (as described in any embodiment above).

According to an embodiment, the allocation of the first and second spatial region sequences of the left and right views to transmission channels is based on approximate or exact bitrates of the spatial region sequences and approximate or exact bandwidth of transmission channels.

In general, the use of multiple transmission channels facilitates processing them in parallel in the display device.

Video encoding is disclosed next. According to an embodiment, a first bitstream and a second bitstream are encoded, wherein the first bitstream comprises the first spatial region sequence and the second bitstream comprises the second spatial region sequence.

It should be noticed that some video or image encoding methods may constrain the pictures to be rectangular and solid. Consequently, the second spatial region may be packed to a rectangular frame prior to encoding. The packing information may be encoded as metadata in or along the second bitstream. For example, the packing information may comprise a region-wise mapping from a pre-defined or indicated source format to the packed frame format, e.g. from a projected frame to a packed VR frame, as described earlier. The region-wise mapping information may for example comprise for each mapped region a source rectangle in the projected frame and a destination rectangle in the packed VR frame, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which VR projection format is used, region-wise quality ranking indicating the picture quality ranking between regions and/or first and second spatial region sequences, one or more transformation operations, such as rotation by 90, 180, or 270 degrees, horizontal mirroring, and vertical mirroring.

According to an embodiment, a first spatial region and a second spatial region are encoded as a first single picture when they are temporally aligned, and a first spatial region is encoded as a second single picture when no second spatial region is temporally aligned with the first spatial region. In order to support this embodiment, the codec and coding format may support temporally varying picture size.

Figure 13:
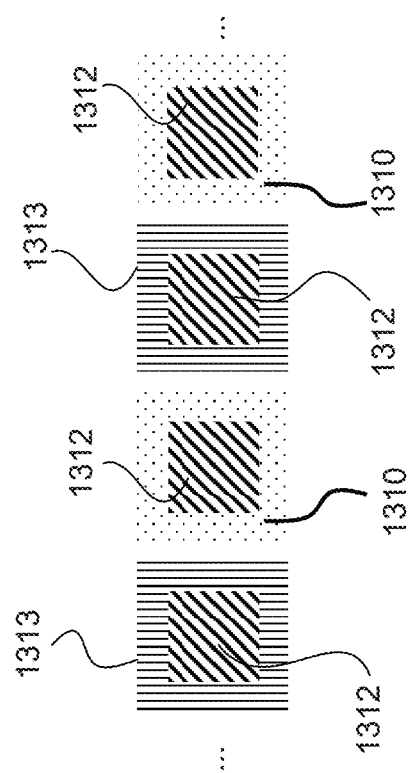
FIG. 13 shows examples of non-coded blocks according to an embodiment.

According to an embodiment, shown in FIG. 13, a single bitstream is encoded with steady picture elements. A first spatial region 1312 and a second spatial region 1313 are encoded as a first single picture when they are temporally aligned, and a first spatial region 1312 and blocks 1310 marked as non-coded are encoded as a second single picture when no second spatial region is temporally aligned with the first spatial region 1312. The area covered by the non-coded blocks 1310 match that of the second spatial region 1313. In some coding arrangements, non-coded blocks may include prediction information but lack prediction error information.

According to an embodiment of a multi-layer coding, the first spatial region sequence is encoded as a first scalable layer of a bitstream, and the second spatial region sequence is encoded as a second scalable layer of the bitstream. According to an embodiment, reference layer location offsets as described earlier, or alike, may be encoded in or along the bitstream to indicate the spatial relation of the first scalable layer and the second scalable layer. According to an embodiment, the second scalable layer may be predicted from the first scalable layer. In an embodiment, inter-layer prediction may be indicated, in or along the bitstream, to copy the decoded first scalable layer into the decoded second scalable layer, and no prediction error is encoded.

According to an embodiment for combination picture rate adaptation with other types of adaptation, the second spatial region sequence may be encoded with different characteristics compared to the first spatial region sequences, the different characteristics comprising one or more of the following:

different bit-depth per color component between the first and second spatial region sequences;
different chroma format between the first and second spatial region sequences, such as 4:4:4 sampling for the first spatial sequence and 4:2:0 sampling for the second spatial region sequence;

different picture quality, e.g. controlled by a quantization step size, such as quantization parameter value of the Advanced Video Coding standard (H.264/AVC) or the High Efficiency Video Coding standard (HEVC), between the first and second spatial region sequences;

different spatial resolution (i.e. sampling density) between the first and the second spatial region sequences;

different color space and/or range and/or gamut between the first and second spatial region sequences; e.g. the first spatial region sequence may use BT.2020 color space, whereas the second spatial region sequence may use BT.709 color space;

different luma and/or color grading between the first and second spatial region sequences; for example, the first spatial region sequences may be brighter than the second spatial region sequence.

According to an embodiment of selective forwarding, the processing device 900 receives the first spatial region 912 sequence and the second spatial region 913 sequence. For example, the processing device 900 may receive the first spatial region sequence 912 and the second spatial region 913 sequence from a streaming server. The processing device 900 may also receive other spatial region sequences, e.g. so that the spatial region sequences may collectively cover the entire 360-degree content. The processing device 900 selects a temporal subset of the received second spatial region 913 sequence. The processing device 900 transmits the temporal subset. Examples of the processing device 900 comprise a mobile edge cloud operating e.g. in a 5G mobile network and an edge server of a content distribution network.

Figure 14:
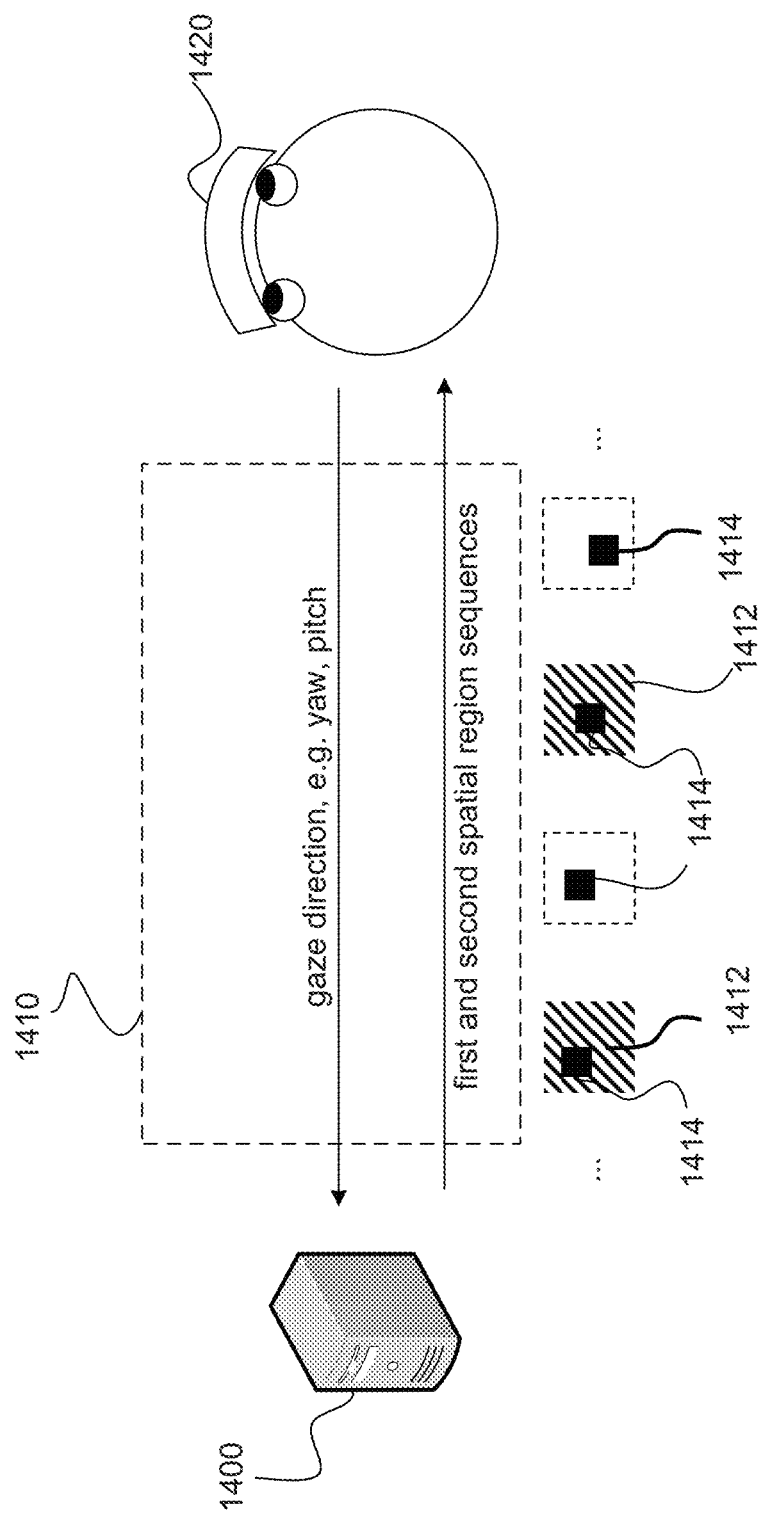
FIG. 14 shows an example of a system according to another embodiment.

FIG. 14 illustrates an example of a foveated rendering at a higher bitrate. A display device 1420 may obtain a gaze position information. The gaze position information may be obtained for example by tracking the gaze of a person using a head-mounted display. The gaze position information may be combined with head orientation information, i.e. the gaze position information may indicate both the head and gaze orientation. The gaze position information is time-varying. The display device transmits the gaze position information to the processing device 1400. The gaze position information may be transmitted virtually continuously or periodically with a small periodic interval.

The processing device 1400 receives the gaze position information. The processing device 1400 also obtains a picture sequence. For example, the picture sequence may be streamed to the processing device 1400. The processing device 1400 selects the inner spatial region 1414, referred here as "fovea region" (gaze region) based on the gaze position information, wherein the fovea region 1414 is a subset of the first spatial region 1412 and mainly matches or covers the gaze position. First spatial region 1412 and the fovea region 1414 are extracted from pictures of the picture sequence. The picture rate of the fovea region sequence may be higher than the picture rate of the first spatial region sequence, for example N times the picture rate of the first spatial region sequence, where N is a positive integer. In this embodiment, the first region may correspond to a prevailing viewport and/or an expected viewport. The second region may be selected to be the fovea region.

The fovea region 1414 sequence may be encoded at a higher perceived quality than the first spatial region 1412 sequence. Consequently, the fovea region 1414 sequence is likely to be perceived as the area being in focus. The fovea region 1414 may be coded in a manner that the perceived quality is the highest approximately in a middle of the fovea region 1414, and gradually degrades towards the boundaries of the fovea region 1414 to match the perceived quality of the first spatial region. The gradual change may be achieved for example by changing a quantization step size in a gradual manner. For example, the quantization parameter (QP) of H.264/AVC or HEVC may be the lowest (i.e. highest picture quality) approximately or exactly at the middle of the fovea region 1414 and is gradually increased to match to the QP value used for the first spatial region 1412.

The differing perceived quality between the first region and the fovea region may be achieved as follows: The first spatial region sequence may be encoded at a first sampling density, a first chroma format, a first picture quality, a first bit-depth, a first dynamic range, and a first color gamut. The fovea region sequence may be encoded at a second sampling density, a second chroma format, a second picture quality, a second bit-depth, a second dynamic range, and a second color gamut, wherein at least one of the second sampling density, the second chroma format, the second picture quality, the second bit-depth, the second dynamic range, and the second color gamut is greater than or provides an enhanced perceived picture quality or fidelity compared to the first sampling density, the first chroma format, the first picture quality, the first bit-depth, the first dynamic range and the first color gamut, respectively.

According to an embodiment, spatially non-uniform sampling may be applied to obtain the fovea region sequence. The sampling density may be the highest at the middle of the fovea region and may gradually decrease towards the boundaries of the fovea region to exactly or approximately match the sampling density of the first spatial region.

According to an embodiment, the first spatial region may also cover the fovea region, the first spatial region may be coded as a first scalable layer, the fovea region may be coded as a second scalable layer. According to an embodiment, inter-layer prediction may be applied from the first scalable layer to the second scalable layer.

According to an embodiment, the picture rate of the picture sequence may be equal to the first picture rate, i.e. lower than that of the second picture rate that is used for the fovea region sequence. Consequently, the same picture of the picture sequence may be used as input for encoding two or more pictures in the fovea region sequence. Rather than increasing the source picture rate or the perceived picture rate of the displayed pictures, the fovea region sequence provides an increase of the picture rate for the fovea region only, i.e. quicker response to gaze changes.

The display device 920, 1420 may provide feedback to the processing device 900, 1400. The feedback may comprise viewport information with or without any other information. The viewport information may comprise one or both of the first viewport parameters of a prevailing viewport, and second viewport parameters of one or more expected viewports. The display device 920, 1420 may for example extrapolate head movement and/or acceleration/deceleration to estimate one or more expected viewports. The processing device 900, 1400 may determine, based on the received viewport parameters, the prevailing and/or expected viewport. This may be done based on the prevailing viewport parameters and the expected viewport parameters, respectively. In one embodiment, processing device 900, 1400 may receive only the prevailing viewport parameters from display device 920, 1420 and determine the expected viewport by adding a predetermined movement margin around or next to the prevailing viewport.

In an embodiment, the processing device (900 or 1400) obtains the picture sequence by receiving and decoding a coded picture sequence.

In an embodiment, the processing device (900 or 1400) converts a first projection format used the picture sequence into a second projection format and the first and second spatial regions and fovea regions are selected from pictures of the second projection format. For example, the picture sequence may comprise equirectangular panorama pictures. The processing device may convert the spatial subset of equirectangular panorama pictures into rectilinear pictures.

Viewport parameters characterize a viewport. Viewport parameters may comprise one or more of spatial location of a reference point (such as a center point), an orientation, extents, and a shape of the viewport. The spatial location may for example be indicated with spherical coordinates, such as yaw and pitch, in a spherical coordinate system. The orientation may for example be indicated with the roll parameters in a spherical coordinate system, where the roll accompanies yaw and pitch of a spatial location. The extents may for example be indicated as horizontal and/or vertical field of view, e.g. in degrees or radians, or a rectangle within a certain projected frame (such as an equirectangular panorama picture of a certain size). The shape may for example be indicated as separate horizontal and vertical parameters for the extents, assuming a rectangular shape.

According to an embodiment, the viewport parameters indicate the viewport that is or can be rendered on the display. The viewport may be larger than the area that a user is able to see at a single point of time due to the optics of the head-mounted display.

According to another embodiment, the viewport parameters indicate the viewport that a user is capable of observing at a single point of time. The viewport may be smaller than the area rendered on the display and may be referred to as a visible viewport. Since head-mounted displays may be adjustable, e.g. for inter-pupillary distance, and since users may have different physical properties, e.g. for eye relief (which may be defined as the distance of the eye from the closest component of the HMD), the visible viewport may be estimated based on expected or average characteristics.

According to an embodiment, the viewport parameters include a movement margin to compensate potential near-term viewport changes (e.g. near-term head movement, when the display device is a head-mounted display). In an embodiment, the viewport parameters are exact, i.e. they indicate the prevailing or expected displayed viewport exactly. According to an embodiment, it is indicated within or along the viewport parameters whether they include movement margin or are exact.

Transmission of the various bitstreams can be done with a multistream capable video interface like MHL (Mobile High-definition Link) or similar. The logical streams can be assigned to different physical lanes in a multilane system. Additional signalling and control may be included in order to enable processing the bitstreams in a proper way in the display device. This may include signalling the method of division to the regions, all video stream parameters, and/or compression methods etc.

In above, embodiments have been described mostly from encoding point of view. Further embodiments for decoding are disclosed in the following.

One or more coded picture sequences or one or more bitstreams are obtained for video decoding e.g. through receiving them from one or more transmission channels. In decoding, a first bitstream comprising the first spatial region sequence at the first picture rate is decoded; and a second bitstream comprising the second spatial region sequence at the second picture rate is decoded.

According to an embodiment, a first spatial region and a second spatial region are decoded as a first single picture when they are temporally aligned; and a first spatial region and blocks marked as non-coded are decoded as a second single picture when no second spatial region is temporally aligned with the first spatial region.

According to an embodiment, the decoding comprises decoding the first spatial region sequence from a first scalable layer of a bitstream; and decoding the second spatial region sequence from a second scalable layer of the bitstream.

According to an embodiment, a first bitstream comprising a first spatial region sequence at the first picture rate is decoded; and a second bitstream comprising a fovea region sequence at the second picture rate is decoded.

According to an embodiment, the first spatial region covers also the fovea region. When a picture of the fovea region sequence is not temporally aligned with a picture of the first spatial region sequence, it may be displayed and the previous picture(s) of the fovea region sequence may be removed gradually (by blending them with collocating area in the first spatial region) or instantly (by replacing them with collocating area in the first spatial region).

It is appreciated that even though some embodiments have been described with reference to video or picture sequences, the embodiments equally apply to visual content that is not video, such as graphics or computer screen content.

Figure 15:
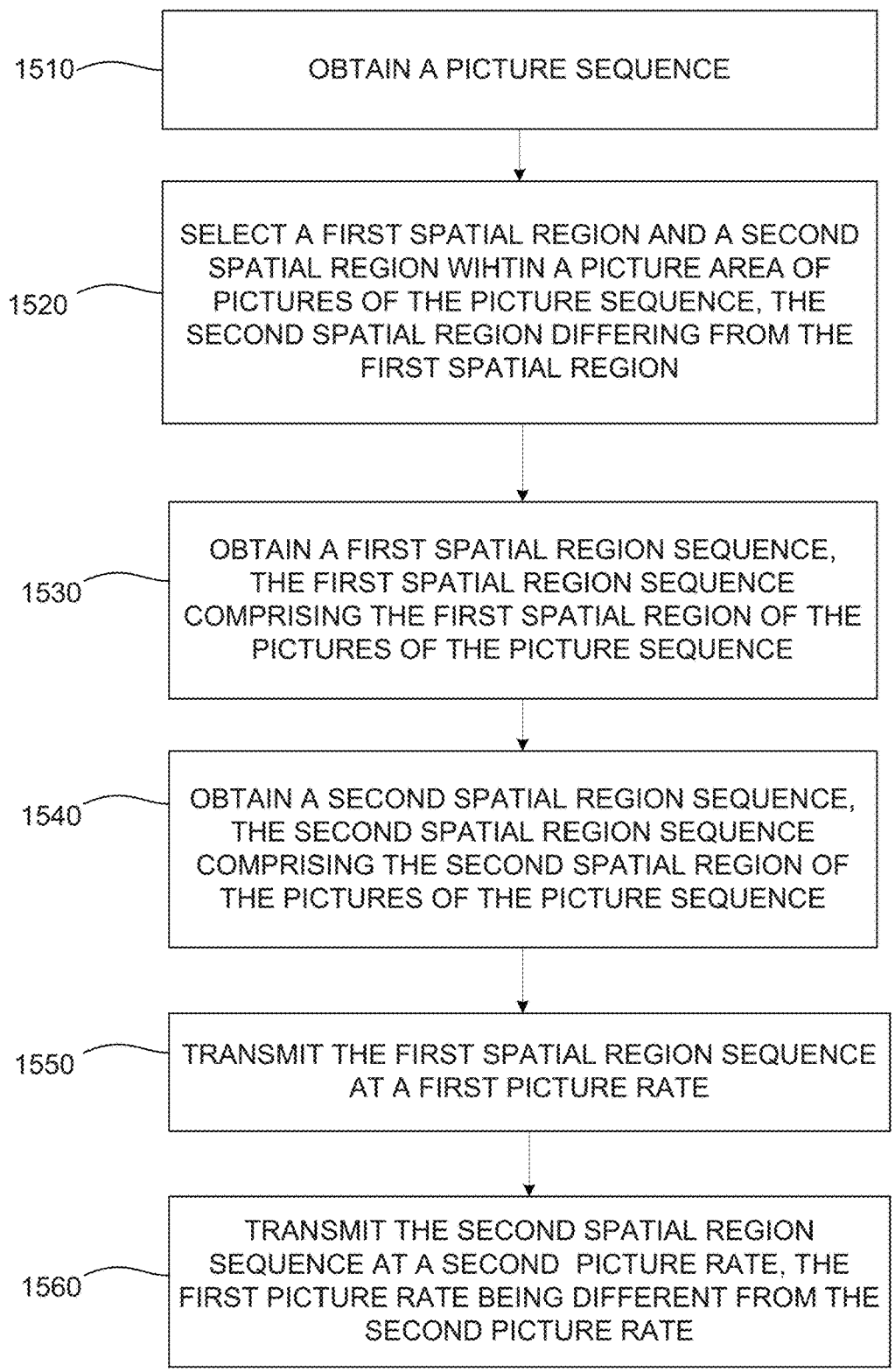
FIG. 15 is a flowchart of a method according to an embodiment.

A method according to an embodiment and performed in a processing device is illustrated in a flowchart of FIG. 15. The method comprises obtaining a picture sequence 1510; selecting 1520 a first spatial region and a second spatial region within a picture area of pictures of the picture sequence, the second spatial region differing from the first spatial region; obtaining 1530 a first spatial region sequence, comprising the first spatial region of the pictures of the picture sequence; obtaining 1540 a second spatial region sequence, comprising the second spatial region of the pictures of the picture sequence; transmitting 1550 the first spatial region sequence at a first picture rate; and transmitting 1560 the second spatial region sequence at a second picture rate, the first picture rate being different from the second picture rate.

In a method the viewport information may be received, and the first spatial regions may be selected based on the viewport information. The viewport information may comprise one or both of first viewport parameters of prevailing viewport, and second viewport parameters of one or more expected viewports, and wherein the viewport parameters characterize a viewport and comprises one or more of a spatial location of a reference point, an orientation, extents, and a shape.

In a method, the first spatial region sequence may be transmitted over a first transmission channel, and the second spatial region sequence may be transmitted over a second transmission channel, wherein the first transmission channel differs from the second transmission channel.

In an embodiment of the method, the first picture rate is greater than the second picture rate, wherein the method may further comprise forming a first sub-sequence of the first spatial region sequence at the second picture rate, wherein the pictures of the first sub-sequence are temporally aligned with the pictures of the second spatial region sequence; forming a second sub-sequence of the first spatial region sequence comprising all pictures not in the first sub-sequence; transmitting the first sub-sequence over a first transmission channel; transmitting the second sub-sequence over a second transmission channel, the second transmission channel differing from the first transmission channel; and transmitting the second spatial region sequence over a third transmission channel, the third transmission channel differing from the second transmission channel.

According to an embodiment, the second spatial region is selected based on the viewport information. The second spatial region may be selected based on the second viewport parameters. Alternatively the second spatial region may be selected based on a movement margin added to the first spatial region or the first viewport parameters. Movement parameters comprising one or more of movement direction, movement speed, and movement acceleration of a viewport, may be received.

According to an embodiment, the picture sequence may be obtained through video encoding. The video encoding may comprise encoding a first bitstream comprising the first spatial region sequence at the first picture rate; and encoding a second bitstream comprising the second spatial region sequence at the second picture rate, the second bitstream being decodable independently of the first bitstream. The video encoding may comprise encoding a first spatial region and a second spatial region as a first single picture when they are temporally aligned; and encoding a first spatial region and blocks marked as non-coded as a second single picture when no second spatial region is temporally aligned with the first spatial region. In addition, or alternatively, the video encoding may comprise encoding the first spatial region sequence as a first scalable layer of a bitstream; and encoding the second spatial region sequence as a second scalable layer of the bitstream. The second scalable layer may be predicted from the first scalable layer.

According to an embodiment, the first picture rate is less than the second picture rate, wherein the method further comprises receiving gaze position information, selecting a second spatial region as a fovea region based on the gaze position information, the fovea region being a subset of the first spatial region; encoding the first spatial region sequence at a first sampling density, a first chroma format, a first picture quality, a first bit-depth, a first dynamic range, and a first color gamut; encoding the second spatial region sequence at a second sampling density, a second chroma format, a second picture quality, a second bit-depth, a second dynamic range, and a second color gamut, wherein at least one of the second sampling density, the second chroma format, the second picture quality, the second bit-depth, the second dynamic range, and the second color gamut is greater than or provides an enhanced perceived picture quality or fidelity compared to the first sampling density, the first chroma format, the first picture quality, the first bit-depth, the first dynamic range, and the first color gamut, respectively. The picture sequence may have a picture rate equal to the first picture rate.

A method according to an embodiment further comprises receiving the first spatial region sequence at the first picture rate; receiving a received second spatial region sequence at the first picture rate; selecting a temporal subset at the second picture rate of the received second spatial region sequence; and transmitting the temporal subset as the second spatial region sequence at the second picture rate.

Figure 16:
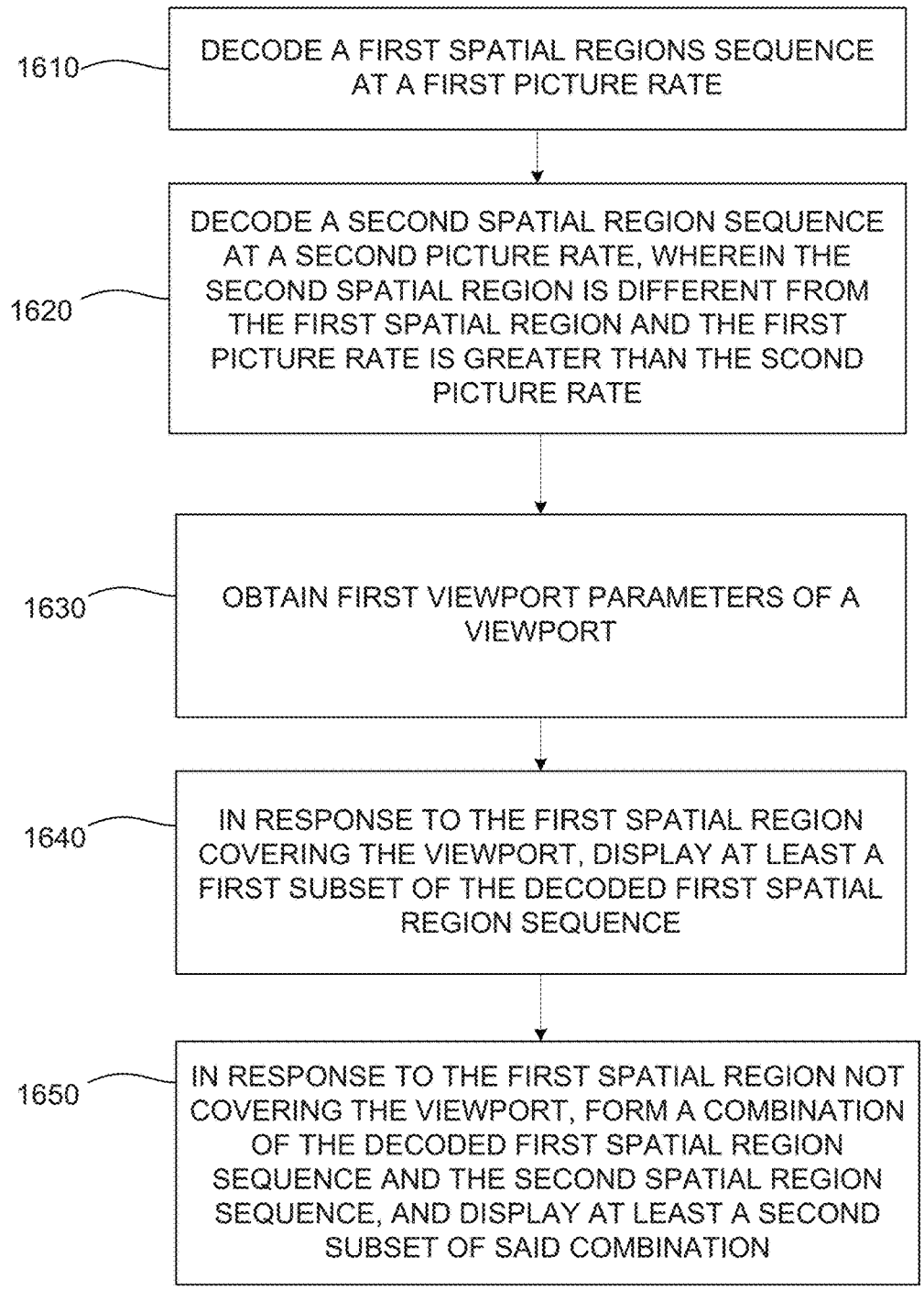
FIG. 16 is a flowchart of a method according to another embodiment.

A method according to an embodiment and performed in a display device is illustrated in a flowchart of FIG. 16. The method comprises decoding 1610 a first spatial region sequence at a first picture rate; decoding 1620 a second spatial region sequence at a second picture rate; the second spatial region differing from the first spatial region and the first picture rate being greater than the second picture rate; obtaining 1630 first viewport parameters of a prevailing viewport; in response to the first spatial region covering the prevailing viewport 1640, displaying at least a first subset of the decoded first spatial region sequence; in response to the first spatial region not covering the prevailing viewport 1650, forming a combination of the decoded first spatial region sequence and the decoded second spatial region sequence, and displaying at least a second subset of said combination.

According to an embodiment, the forming of the combination may comprise decreasing a picture rate of the first spatial region sequence to be the same as the second picture rate. Alternatively, the forming of the combination may comprise increasing a picture rate of the second spatial region sequence to be the same as the first picture rate. Yet, as a further alternative, the forming of the combination may comprise decreasing a picture rate of the first spatial region sequence to be a third picture rate; and increasing a picture rate of the second spatial region sequence to be the third picture rate. In any of the embodiments, the luminance or brightness can be gradually decreased from a first luminance level for a first spatial region to a second luminance level for a second spatial region.

According to an embodiment, a video decoding comprises decoding a first bitstream comprising the first spatial region sequence at the first picture rate; and decoding a second bitstream comprising the second spatial region sequence at the second picture rate.

According to an embodiment, the video decoding comprises decoding a first spatial region and a second spatial region as a first single picture when they are temporally aligned; and decoding a first spatial region and blocks marked as non-coded as a second single picture when no second spatial region is temporally aligned with the first spatial region.

According to an embodiment, the video decoding comprises decoding the first spatial region sequence as a first scalable layer of a bitstream; and decoding the second spatial region sequence as a second scalable layer of the bitstream. The second scalable layer may be predicted from the first scalable layer.

According to an embodiment, the method further comprises one or both of the following: transmitting the first viewport parameters; and estimating second viewport parameters of one or more of expected viewports and transmitting the second viewport parameters. The viewport parameters may characterize a viewport and comprise one or more of spatial location of a reference point, an orientation, extents, and a shape. The method may further comprise receiving the first spatial region sequence and the second spatial region sequence. Alternatively, the first spatial region sequence may be received over a first transmission channel; and the second spatial region sequence may be received over a second transmission channel.

According to an embodiment, the transmission channel is a lane in a cable.

Some embodiments were discussed above with references to a head-mounted display. It needs to be understood that the embodiments apply to other types of display devices too. For example, a smartphone or tablet may be used as a display device. A user may control the viewing orientation with manual controls such as swiping the screen, with input devices such as a mouse or a joystick, and/or with the orientation of the device.

Some embodiments were discussed above with references to rectangular first and second spatial regions and a rectangular display viewport. Rectangular viewports may suit some projection or representation formats, such as rectilinear projections. In general, it needs to be understood that embodiments are not limited to rectangular first and second spatial regions or a rectangular display viewport. The projection or representation format may affect the shape of first and second spatial regions. The viewing orientation may affect the shape and size of the first and second spatial regions. Additionally or alternatively, the shape of the first and second spatial regions may be selected to be rectangular and may be a bounding box that includes intended viewports having non-rectangular shape(s). The characteristics of the display device may affect the shape of the display viewport.

Embodiments were described with reference to the first and second spatial region sequences. It needs to be understood that embodiments are not limited to two spatial region sequences and generally apply to more than two spatial region sequences. For example, a first spatial region may be selected according to the viewport that a user is capable of observing at a single point of time, a second spatial region may be selected according to the viewport that is rendered on a display, and a third spatial region may be selected in a manner that no head and/or gaze movement is expected to cause a display viewport exceed the boundaries of the combined first, second, and third spatial region. In another example, a fovea region is selected based on gaze position information, a first spatial region may be selected according to the viewport that is rendered on a display, and a second spatial region may be selected in a manner that no head and/or gaze movement is expected to cause a display viewport exceed the boundaries of the combined fovea region, the first spatial region, and second spatial region.

Some embodiments have been described with an emphasis being either at the processing device 900, 1400 or the display device 920, 1420. It is however to be understood that the processing device and the display device are functionally interrelated products. Therefore, when either of the devices is described to perform a function, the other device is implicitly described to perform a corresponding function. For example, transmitting data from one device implicitly describes receiving the data by the other device.

In previous, methods according to embodiments were discussed by means of various examples. An apparatus according to an embodiment comprises means for implementing the method. These means may comprise a computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method comprising:
   decoding a first spatial region sequence at a first picture rate, the first spatial region sequence covering a first spatial region;
   decoding a second spatial region sequence at a second picture rate, the second spatial region sequence covering a second spatial region, wherein the second spatial region is different from the first spatial region and the first picture rate is greater than the second picture rate, and wherein the first spatial region sequence comprises a first sub-sequence at the second picture rate and a second sub-sequence comprising pictures of the first spatial region sequence not in the first sub-sequence, and wherein pictures of the first sub-sequence are temporally aligned with pictures of the second spatial region sequence, wherein decoding the first spatial region sequence comprises decoding the first spatial region sequence from a first scalable layer of a bitstream, and wherein decoding the second spatial region sequence comprises decoding the second spatial region sequence from a second scalable layer of the bitstream;
   obtaining first viewport parameters of a viewport;
   in response to the first spatial region covering the viewport, displaying at least a first subset of the decoded first spatial region sequence; and
   in response to the first spatial region not covering the viewport:
      forming a combination of the decoded first spatial region sequence and the second spatial region sequence; and
      displaying at least a second subset of said combination.

2. A method according to claim 1, wherein the viewport is one of a following: a display viewport, or a visible viewport.

3. A method according to claim 1, wherein the viewport is one of a following: a prevailing viewport, or an expected viewport, wherein the expected viewport accounts for head and/or gaze movement possibly taking place.

4. A method according to claim 1, wherein the forming of the combination comprises decreasing a picture rate of the first spatial region sequence to be the same or substantially same as the second picture rate, or increasing a picture rate of the second spatial region sequence to be the same or substantially same as the first picture rate.

5. A method according to claim 1, wherein the forming of the combination comprises:
   decreasing a picture rate of the first spatial region sequence to be a third picture rate; and
   increasing a picture rate of the second spatial region sequence to be the third picture rate.

6. A method according to claim 1, wherein decoding the first spatial region sequence comprises decoding a first bitstream comprising the first spatial region sequence at the first picture rate, and wherein decoding the second spatial region sequence comprises decoding a second bitstream comprising the second spatial region sequence at the second picture rate.

7. A method according to claim 1, wherein the decoding the first spatial region sequence and the second spatial region sequence comprises:

decoding a first coded spatial region of the first spatial region sequence and a second coded spatial region of the second spatial region sequence as a first single coded picture when the first and second coded spatial regions are temporally aligned; and decoding the first coded spatial region and blocks marked as non-coded as a second single coded picture when no coded spatial region of the second spatial region sequence is temporally aligned with the first coded spatial region.

8. An apparatus comprising at least one processor, at least one memory including computer program code, the at least one memory and the computer program code configured to, with the at least one processor, cause the apparatus to:

decode a first spatial region sequence at a first picture rate, the first spatial region sequence covering a first spatial region;

decode a second spatial region sequence at a second picture rate, the second spatial region sequence covering a second spatial region, wherein the second spatial region is different from the first spatial region and the first picture rate is greater than the second picture rate, and wherein the first spatial region sequence comprises a first sub-sequence at the second picture rate and a second sub-sequence comprising pictures of the first spatial region sequence not in the first sub-sequence, and wherein pictures of the first sub-sequence are temporally aligned with pictures of the second spatial region sequence, wherein to decode the first spatial region sequence the apparatus is further caused to decode the first spatial region sequence from a first scalable layer of a bitstream, and wherein to decode the second spatial region sequence the apparatus is further caused to decode the second spatial region sequence from a second scalable layer of the bitstream;

obtain first viewport parameters of a viewport;

in response to the first spatial region covering the viewport, display at least a first subset of the decoded first spatial region sequence; and in response to the first spatial region not covering the viewport:
form a combination of the decoded first spatial region sequence and the second spatial region sequence; and
display at least a second subset of said combination.

9. The apparatus according to claim 8, wherein the viewport is one of a following: a display viewport, or a visible viewport.

10. The apparatus according to claim 8, wherein the viewport is one of a following: a prevailing viewport, or an expected viewport, wherein the expected viewport accounts for head and/or gaze movement possibly taking place.

11. The apparatus according to claim 8, wherein to form of the combination, the apparatus is further caused to decrease a picture rate of the first spatial region sequence to be the same or substantially same as the second picture rate, or increase a picture rate of the second spatial region sequence to be the same or substantially same as the first picture rate.

12. The apparatus according to claim 8, wherein to form of the combination, the apparatus is further caused to:
decrease a picture rate of the first spatial region sequence to be a third picture rate; and
increase a picture rate of the second spatial region sequence to be the third picture rate.

13. The apparatus according to claim 8, wherein to decode the first spatial region sequence the apparatus is further caused to decode a first bitstream comprising the first spatial region sequence at the first picture rate, and wherein to decode the second spatial region sequence the apparatus is further caused to decode a second bitstream comprising the second spatial region sequence at the second picture rate.

14. The apparatus according to claim 8, wherein to decode the first spatial region sequence and the second spatial region sequence the apparatus is further caused to:
decode a first coded spatial region of the first spatial region sequence and a second coded spatial region of the second spatial region sequence as a first single coded picture when the first and second coded spatial regions are temporally aligned; and
decode the first coded spatial region and blocks marked as non-coded as a second single coded picture when no coded spatial region of the second spatial region sequence is temporally aligned with the first coded spatial region.

15. A computer program product embodied on a non-transitory computer readable medium, comprising computer program code configured to, when executed on at least one processor, cause an apparatus or a system to:

decode a first spatial region sequence at a first picture rate, the first spatial region sequence covering a first spatial region;

decode a second spatial region sequence at a second picture rate, the second spatial region sequence covering a second spatial region, wherein the second spatial region is different from the first spatial region and the first picture rate is greater than the second picture rate, and wherein the first spatial region sequence comprises a first sub-sequence at the second picture rate and a second sub-sequence comprising pictures of the first spatial region sequence not in the first sub-sequence, and wherein pictures of the first sub-sequence are temporally aligned with pictures of the second spatial region sequence, wherein to decode the first spatial region sequence the apparatus or the system is further caused to decode the first spatial region sequence from a first scalable layer of a bitstream, and wherein to decode the second spatial region sequence the apparatus or the system is further caused to decode the second spatial region sequence from a second scalable layer of the bitstream;

obtain first viewport parameters of a viewport;

in response to the first spatial region covering the viewport, display at least a first subset of the decoded first spatial region sequence; and in response to the first spatial region not covering the viewport:
form a combination of the decoded first spatial region sequence and the second spatial region sequence; and
display at least a second subset of said combination.

16. The computer program product according to claim 15, wherein to decode the first spatial region sequence the apparatus or the system is further caused to decode a first bitstream comprising the first spatial region sequence at the first picture rate, and wherein to decode the second spatial region sequence the apparatus or the system is further caused to decode a second bitstream comprising the second spatial region sequence at the second picture rate.

17. The computer program product according to claim 15, wherein to decode the first spatial region sequence and the second spatial region sequence the apparatus or the system is further caused to:

decode a first coded spatial region of the first spatial region sequence and a second coded spatial region of the second spatial region sequence as a first single coded picture when the first and second coded spatial regions are temporally aligned; and decode the first coded spatial region and blocks marked as non-coded as a second single coded picture when no coded spatial region of the second spatial region sequence is temporally aligned with the first coded spatial region.

* * * * *